United States Patent [19]

Torobin

[11] 4,303,432

[45] Dec. 1, 1981

[54] METHOD FOR COMPRESSING GASEOUS MATERIALS IN A CONTAINED VOLUME

[76] Inventor: Leonard B. Torobin, Materials Technology Corp., P.O. Box 6844, Bellevue, Wash. 98007

[21] Appl. No.: 179,151

[22] Filed: Aug. 18, 1980

Related U.S. Application Data

[63] Continuation of Ser. No. 69,295, Aug. 24, 1979, abandoned, which is a continuation-in-part of Ser. No. 59,297, Jul. 20, 1979, abandoned, which is a continuation-in-part of Ser. No. 944,643, Sep. 21, 1978, abandoned, which is a continuation-in-part of Ser. No. 937,123, Aug. 28, 1978, abandoned.

[51] Int. Cl.³ .................. C03B 19/10; C03C 25/02
[52] U.S. Cl. .......................................... 65/21.4; 65/22; 65/142; 65/60.4; 264/5; 264/12; 264/14; 264/50; 264/167; 264/513; 425/7; 425/463; 425/804; 425/DIG. 217
[58] Field of Search .............. 65/21.4, 22, 60 C, 142; 264/5, 12, 14, 50, 167, 513; 425/7, 463, 804, DIG. 217

[56] References Cited

U.S. PATENT DOCUMENTS

| | | | |
|---|---|---|---|
| 948,541 | 2/1910 | Coleman | 65/22 |
| 1,871,792 | 8/1932 | Horsfield | 65/21 |
| 2,187,432 | 1/1940 | Powers | 65/22 X |
| 3,186,812 | 6/1965 | Phaender | 65/55 |
| 3,365,315 | 1/1968 | Beck et al. | 65/22 |
| 3,421,873 | 1/1969 | Burgman et al. | 65/2 |
| 3,607,169 | 9/1971 | Coxe | 65/21 |
| 3,765,853 | 10/1973 | Riebling | 65/18 |
| 3,955,956 | 5/1976 | Terner | 65/22 X |
| 4,026,499 | 5/1977 | Crosby | 65/22 X |
| 4,116,656 | 9/1978 | Mukai et al. | 65/5 |

FOREIGN PATENT DOCUMENTS

| | | | |
|---|---|---|---|
| 49-5722 | 2/1974 | Japan | 65/22 |
| 843838 | 9/1958 | United Kingdom . | |

OTHER PUBLICATIONS

"Development of Glasses for Application as Laser Fusion Targets", Shelby Sandia Labs., Livermore, Calif., SAND 76-8235, pp. 5-27, Jan. 1977.

*Primary Examiner*—Robert L. Lindsay, Jr.
*Attorney, Agent, or Firm*—Perry Carvellas

[57] ABSTRACT

A method for compressing gases in a contained volume consisting of hollow glass microspheres is described. The gases are compressed under high pressure and can be easily handled and stored. The gases to be compressed and contained in the microspheres are used as blowing gases to blow the microspheres.

The hollow glass microspheres are made by forming a liquid film of molten glass across a coaxial blowing nozzle, applying the blowing gas at a positive pressure on the inner surface of the glass film to blow the film and form an elongated cylinder shaped liquid film of molten glass. A transverse jet is used to direct an entraining fluid over and around the blowing nozzle at an angle to the axis of the blowing nozzle. The entraining fluid as it passes over and around the blowing nozzle fluid dynamically induces a pulsating or fluctuating pressure field at the opposite or lee side of the blowing nozzle in the wake or shadow of the coaxial blowing nozzle. The continued movement of the entraining fluid over the elongated cylinder produces asymmetric fluid drag forces on the cylinder and closes and detaches the elongated cylinder from the coaxial blowing nozzle and the detached cylinder by the action of surface tension forms into a spherical shape.

Quench nozzles are disposed below and on either side of the blowing nozzle and direct cooling fluid at and into contact with the molten glass microspheres to rapidly cool and solidify the molten glass to form a hard, smooth hollow glass microsphere. Where a metal coating is desired within the microsphere, a metal vapor is added to the blowing gas. When the microsphere is cooled, the metal vapor cools, condenses and deposits on the inner wall surface of the microsphere as a metal coating.

66 Claims, 5 Drawing Figures

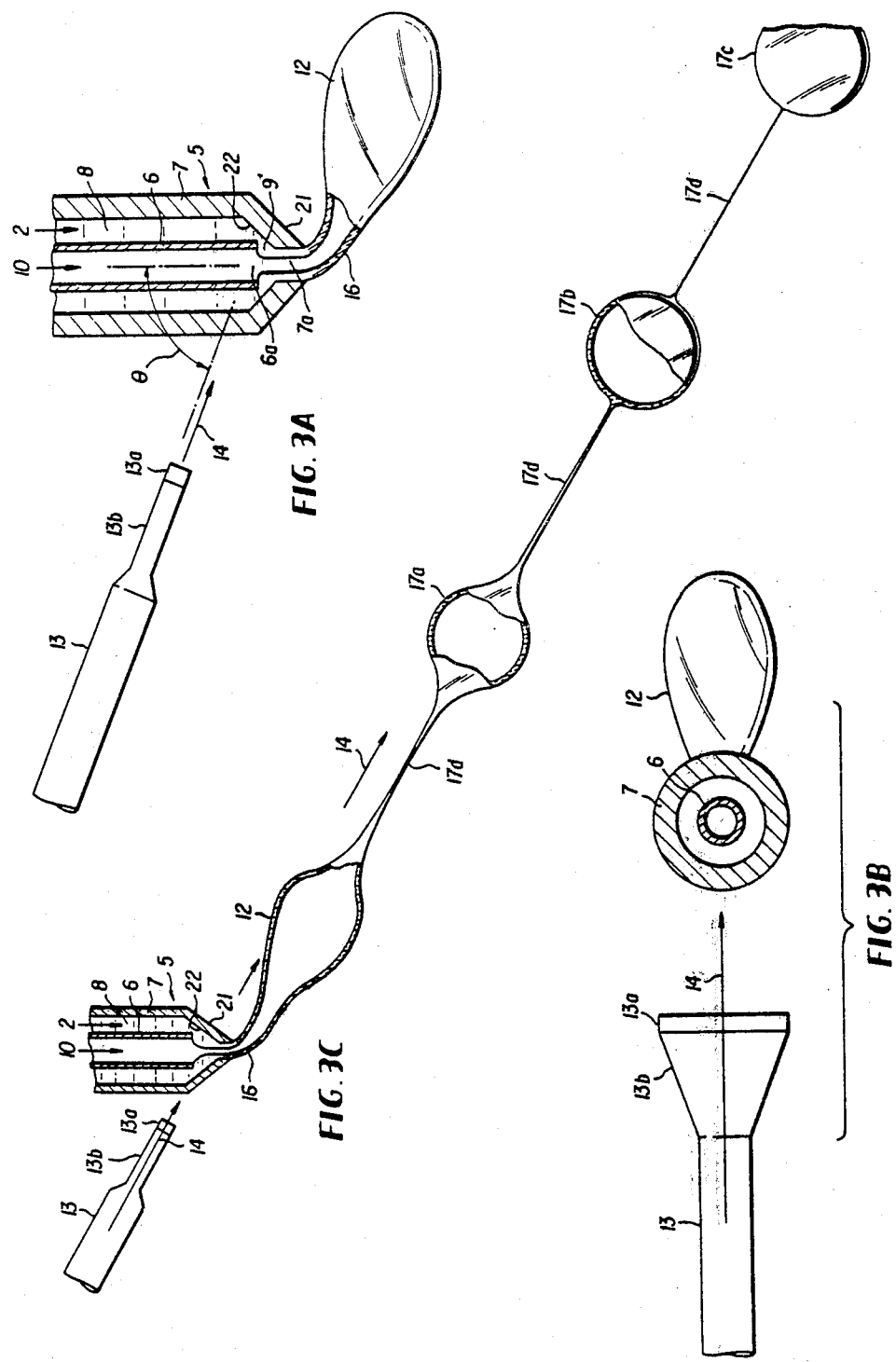

METHOD FOR COMPRESSING GASEOUS MATERIALS IN A CONTAINED VOLUME

This is a continuation, of application Ser. No. 069,295, filed Aug. 24, 1979 which application is a continuation-in-part of applicant's applications Ser. No. 059,297, filed July 20, 1979, Ser. No. 944,643, filed Sept. 21, 1978, and Ser. No. 937,123, filed Aug. 28, 1978 all abandoned.

SUMMARY OF THE INVENTION

The present invention relates to hollow microspheres made from inorganic film forming materials and compositions and particularly to hollow glass microspheres and to a process and apparatus for making the microspheres.

The present invention particularly relates to a method for compressing gaseous materials in hollow glass microspheres.

The present invention also particularly relates to hollow glass microspheres having a gaseous material under high pressure within the contained volume of the microsphere.

The present invention also relates to hollow glass microspheres having a gaseous material under high pressure within the contained volume of the microspheres and having a metal coating deposited on the inner wall surface of the microsphere.

The present invention relates to a method and apparatus for blowing the microspheres from a molten glass using a coaxial blowing nozzle and the desired gaseous material blowing gas or the gaseous material and a metal vapor to blow the molten glass to form a hollow glass microsphere with the contained gaseous material under high pressure.

The present invention relates to a method and apparatus for using a coaxial blowing nozzle to blow microspheres from liquid glass compositions comprising subjecting the microsphere during its formation to an external pulsating or fluctuating pressure field having periodic oscillations, said pulsating or fluctuating pressure field acting on said microsphere to assist in its formation and to assist in detaching the microsphere from said blowing nozzle.

The invention particularly relates to a method and apparatus for blowing the microspheres from inorganic film forming materials or compositions and particularly to blowing microspheres from a molten glass using a coaxial blowing nozzle and a blowing gas or a blowing gas and a metal vapor to blow the molten glass to form a hollow glass microsphere with the contained gas under pressure.

The invention also relates to a method and apparatus for blowing the microspheres from liquid glass compositions using a coaxial blowing nozzle and a blowing gas or a blowing glass containing dispersed metal particles and/or an organo metal compound to blow the liquid glass to form a hollow glass microsphere with the contained gas under pressure. The metal particles deposit and/or the organo metal compound decomposes to deposit a thin transparent or reflective metal coating on the inner wall surface of the microsphere.

A transverse jet is used to direct an entraining fluid over and around the blowing nozzle at an angle to the axis of the blowing nozzle. The entraining fluid as it passes over and around the blowing nozzle envelops and acts on the molten glass as it is being blown to form the microsphere and to detach the microsphere from the coaxial blowing nozzle. Quench means are disposed close to and below the blowing nozzles to direct a quench fluid onto the microspheres to rapidly cool and solidify the microspheres.

The present invention relates to the use of the hollow glass microspheres and the hollow glass microspheres having a transparent or reflective coating deposited on the inner wall surface thereof for the handling and storage of gaseous materials under high pressure. The hollow glass microspheres of the present invention, depending on their diameter and their wall thickness and the particular glass composition from which they are made, are capable of withstanding very high internal gas pressures. The hollow glass microspheres are resistant to high temperatures, stable to many chemical agents and weathering conditions. These characteristics make them suitable for the handling and storage of gaseous materials generally and particularly for toxic and corrosive gaseous materials at high pressures.

The present invention also relates to a method and apparatus for making filamented glass microspheres with thin glass filaments connecting adjacent microspheres and to the filamented microspheres themselves.

The hollow glass microspheres of the present invention, depending on their diameter and their wall thickness and the particular glass composition from which they are made, are capable of withstanding relatively high internal pressures and/or external weight.

BACKGROUND OF THE INVENTION

In recent years, the substantial increases in the costs of handling and storage of gaseous materials has created an incentive for improved methods of handling and storage of gaseous materials. The manufacture of highly toxic, corrosive and/or poisonous gases or waste gases has created a serious problem of handling and storage of the materials and/or of disposal of unwanted materials. Environmental problems have been created by the need to find adequate and safe means for handling and storing radioactive atomic energy fuel and fuel waste materials. There has also developed a need in inertial confinement fusion systems for a means of obtaining under high pressure small target fuel materials contained in a material from which they do not diffuse or do not diffuse at a high rate.

Hollow glass microspheres have been used as microcontainers for mixtures of hydrogen isotope gases which were used as laser targets to obtain or attempt to obtain thermonuclear reactions. However, the method of making the glass microspheres, the microspheres themselves and the method of filling the microspheres have several disadvantages. The commercially available glass microspheres are made by grinding glass to a desired particle size and heating the ground particles to a high temperature to "blow" the particles into hollow glass microspheres. The "blowing" gas in the known procedure is gas that had been trapped in the glass during the manufacture of the glass. The microspheres that are obtained are of non-uniform size, shape and wall thickness and have contained in the walls thereof small trapped gas bubbles.

The microspheres that are to be used as laser fuel targets must be of uniform size and wall thickness as a consequence of which only a very small proportion of the commercially produced microspheres can be used, for example, one in a million. Further, the gas used to blow the microspheres must be purged and the desired hydrogen isotope gases introduced into the microspheres. The method now used to introduce the hydrogen isotope gases into the microspheres involves relatively high temperature and very high pressure gas permeation or diffusion techniques. The hydrogen gases under high pressure are made to slowly diffuse through the "pores" of the glass microsphere and displace the internal gas in the microsphere. Cooling the microspheres and maintaining the microspheres under refrigeration can substantially reduce loss of the gases thus compressed into the microspheres. Over a long period of time, however, significant amounts of the compressed gases diffuse out of the microspheres which results in a loss of the hydrogen gases fuel and efficiency of the thermonuclear reaction.

The known methods for producing hollow glass microspheres have not been successful in producing microspheres of relatively uniform size or uniform thin walls which makes it very difficult to produce hollow glass microspheres of controlled and predictable characteristics and quality and strength or at low cost which are capable of containing elevated internal gas pressures without significant pressure loss.

An inherent problem with the known method of making microspheres is that since the glass microspheres had to be sufficiently porous to allow the gases to diffuse into the microspheres some of the pressurized gases will diffuse out of the microspheres. Another problem is that the method is limited to the use of low molecular weight gases for diffusing into the microspheres. There is the additional problem that the prior art pressurized microspheres are required to be maintained under refrigeration to minimize outward diffusion of the pressurized gases.

A serious problem that exists with the known method is that the small gas bubbles that are trapped in the walls of the microspheres during manufacture of the microspheres weakens the microspheres, thus limiting to some extent the amount of hydrogen isotope gases or other gases, that is the pressure of the gases, that can be contained in the microspheres.

The known methods of producing hollow glass microspheres, for example, as disclosed in the Veatch et al U.S. Pat. No. 2,797,201 or Beck et al U.S. Pat. No. 3,365,315, involve dispersing a liquid and/or solid gas-phase precursor material in the glass material to be blown to form the microspheres. The glass material containing the solid or liquid gas-phase precursor enclosed therein is then heated to convert the solid and/or liquid gas-phase precursor material into a gas and is further heated to expand the gas and produce the hollow gas microsphere containing therein the expanded gas. This process is, understandably, difficult to control and of necessity, i.e. inherently, produces glass microspheres of random size and wall thickness, microspheres with walls that have sections or portions of the walls that are relatively thin, walls that have holes, small trapped bubbles, trapped or dissolved gases, any one or more of which will result in a substantial weakening of the microspheres, and a substantial number or proportion of microspheres which are not suitable for use which must be scrapped or recycled. Also, the relatively high cost and the relatively small size of the prior art microspheres has limited their use.

Further, the known methods for producing hollow glass microspheres usually rely on high soda content glass compositions because of their relatively low melting temperatures. These glass compositions, however, were found to have poor long term weathering characteristics and a relatively high mean atomic number.

In addition, applicant found in his initial attempts to use an inert blowing gas to blow a thin molten glass film to form a microsphere that the formation of the glass microsphere was extremely sensitive and that unstable glass films were produced which burst into minute sprays of droplets before a molten glass film could be blown into a microsphere and detached from a blowing nozzle. There was also a tendency for the molten glass fluid to creep up the blowing nozzle under the action of wetting forces. Thus, the initial attempts to blow hollow glass microspheres from thin molten glass films were unsuccessful.

In addition, in some applications, the use of low density microspheres presents a serious problem because they are difficult to handle since they are readily elutriated and tend to blow about. In situations of this type, the filamented microspheres of the present invention provide a convenient and safe method of handling the microspheres.

OBJECTS OF THE INVENTION

It is an object of the present invention to provide a process and an apparatus for making hollow microspheres from inorganic film forming materials and/or compositions.

It is another object of the present invention to produce hollow glass microspheres having uniform thin walls which walls are substantially free of trapped gas bubbles or dissolved gases or solvents which can form bubbles and/or escape.

It is another object of the present invention to produce hollow glass microspheres which are substantially resistant to heat, chemical agents and alkali materials.

It is another object of the invention to provide a method and apparatus for compressing gaseous materials in a contained volume consisting of hollow glass microspheres.

It is another object of the present invention to produce hollow glass microspheres containing a gaseous material at high pressure within the contained volume of the microsphere.

It is another object of the present invention to produce hollow glass microspheres containing a gaseous material at high pressure and having deposited on the inner wall surface thereof a metal coating.

It is another object of the present invention to produce hollow glass microspheres having deposited on the inner wall surface thereof a thin transparent metal coating.

It is another object of the present invention to produce hollow glass microspheres having deposited on the inner wall surface thereof a reflective metal coating.

It is another object of the present invention to produce hollow glass microspheres containing a gaseous material under high pressure which microspheres substantially prevent the diffusion of the high pressure gaseous material out of the microspheres.

It is another object of the present invention to produce hollow glass microspheres containing a gaseous material under high pressure which microspheres are substantially resistant to chemical agents and alkali materials.

It is another object of the present invention to produce in an economical simple manner hollow glass microspheres which are substantially spherical in shape, uniform in size and wall thickness, and which have high strength characteristics.

It is another object of the present invention to provide a method from compressing gaseous materials in hollow glass microspheres by using apparatus which does not employ moving parts, thereby substantially facilitating the compression of the gaseous material and manufacturing the microspheres at high temperatures under carefully controlled conditions and in an economical manner which lends itself to commercial large scale operations.

It is another object of the present invention to utilize the high strength hollow glass microspheres of the present invention in the handling and storage of gaseous materials generally and particularly toxic, corrosive and/or poisonous gases and toxic and/or corrosive atomic energy fuel and fuel waste gaseous materials.

It is still another object of the present invention to utilize the hollow glass microspheres of the present invention for the handling and storage of oxygen, hydrogen, nitrogen and carbon dioxide gases at high pressure.

It is still another object of the present invention to utilize the hollow glass microspheres of the present invention for the handling and storage of unstable gases.

It is still another object of the present invention to utilize the hollow glass microspheres for the handling and storage of gaseous atomic energy fuel waste products in concrete and/or geological structures.

It is still another object of the present invention to utilize the hollow glass microspheres of the present invention in the manufacture of fuel targets for use in inertial confinement fusion reactor research and/or reactors.

It is another object of the present invention to produce hollow glass filamented microspheres with a thin glass filament connecting adjacent glass microspheres.

BRIEF DESCRIPTION OF THE INVENTION

The present invention relates to hollow glass microspheres and to a process and apparatus for making the microspheres. The present invention more particularly relates to a method and apparatus for compressing gases in a contained volume consisting of a hollow glass microsphere.

The microspheres are made from a glass composition selected for the particular gaseous material to be contained therein. The microsphere can also be made to contain a metal coating deposited on the inner wall surface of the microspheres. The metal coating, depending on its thickness, can be transparent or reflective.

The present invention more particularly relates to the use of hollow glass microspheres in the manufacture of improved methods for storing and handling contained gases at elevated pressures.

The glass microspheres of the present invention can be used to handle and store gaseous materials, generally such as oxygen, hydrogen, nitrogen and carbon dioxide; toxic, corrosive and/or poisonous and/or waste gases and radioactive atomic energy fuel material and fuel waste material and in the handling and storage of unstable gases. The microspheres can be used in the manufacture of laser fuel targets for hydrogen fusion reactor research and reactors. An advantageous use of the hollow microspheres is in the manufacture of laser fuel targets for inertial confinement fusion systems and reactors.

Particular and advantageous uses of the hollow glass microspheres are for the storage of atomic fuel waste materials and the manufacture of laser fuel targets for inertial confinement fusion systems and reactors.

The hollow glass microspheres of the present invention are made by forming a liquid film of molten glass across a coaxial blowing nozzle, applying the blowing gas at a positive pressure on the inner surface of the glass film to blow the film and form an elongated cylinder shaped liquid film of molten glass which is closed at its outer end. The hollow glass microspheres of the present invention can also be made by using as the blowing gas a gas containing a metal vapor, dispersed metal particles and/or an organo metal compound. A balancing but slightly lower gas pressure is provided in the area of the blowing nozzle into which the elongated cylinder shaped liquid film is blown.

A transverse jet is used to direct an inert entraining fluid over and around the blowing nozzle at an angle to the axis of the blowing nozzle. The entraining fluid as it passes over and around the blowing nozzle and the elongated cylinder fluid dynamically induces a pulsating or fluctuating pressure field at the opposite or lee side of the blowing nozzle in the wake or shadow of the blowing nozzle. The fluctuating pressure field has regular periodic lateral oscillations similar to those of a flag flapping in a breeze. The transverse jet entraining fluid can also be pulsed at regular intervals to assist in controlling the size of the microspheres and in separating the microspheres from the blowing nozzle and the distance or spacing between microspheres.

The entraining fluid envelops and acts asymmetrically on the elongated cylinder and causes the cylinder to flap, fold, pinch and close-off at its inner end at a point proximate to the coaxial blowing nozzle. The continued movement of the entraining fluid over the elongated cylinder produces fluid drag forces on the cylinder and detaches the elongated cylinder from the coaxial blowing nozzle to have it fall from the blowing nozzle. The surface tension forces of the molten glass act on the now free falling elongated cylinder and cause the cylinder to seek a minimum surface area and to form a spherical shape.

Quench nozzles are disposed below and on either side of the blowing nozzle and direct cooling fluid at and into contact with the molten glass microspheres to rapidly cool and solidify the molten glass and form a hard, smooth hollow glass microsphere. Where a metal vapor in admixture with a blowing gas is used to blow the microspheres, the quench fluid cools and condenses the metal vapor and causes the metal vapor to deposit on the inner wall surface of the microsphere as a transparent metal coating or a thin reflective metal coating.

The microspheres can be made from glass compositions selected for their desired optical and chemical properties and for the particular gaseous material to be contained therein.

Where a gas containing dispersed metal particles is used to blow the microspheres, a metal layer is deposited on the inner wall surface of the microsphere as a thin metal coating. Where a gaseous organo metal compound is used to deposit the metal layer, a gaseous organo metal compound is used as or with the blowing gas to blow the microspheres. The organo metal compound can be decomposed just prior to blowing the microspheres or after the microspheres are formed by, for example, subjecting the blowing gas or the microspheres to heat and/or an electrical discharge means.

The filamented microspheres are made in a manner such that they are connected or attached to each other by a thin continuous glass filament. The filamented microspheres also assist in handling and preventing scattering of microspheres, particularly where very small diameter microspheres or low density microspheres are produced.

THE ADVANTAGES

The present invention overcomes many of the problems associated with prior attempts to produce hollow glass microspheres containing and/or to contain gaseous materials at high pressures. The process and apparatus of the present invention allows the production of hollow glass microspheres having predetermined diameters, wall thicknesses, strength and resistance to chemical agents and weathering and gas permeability such that improved systems can be designed, manufactured and tailor made for storage and handling of contained gases to suit a particular desired use. The diameter, wall thickness and uniformity and the strength and resistance to chemical agents characteristics of the microspheres can be determined by carefully selecting the constituents of the glass composition and controlling the blowing gas pressure and temperature and viscosity and thickness of the molten glass film from which the microspheres are formed. The inner volume of the microspheres contains at high pressure the gaseous material used to blow the microsphere which is to be maintained with the microsphere. The hollow glass microspheres can have a transparent or a reflective metal coating deposited on the inner wall surface of the microsphere. The reflective metal coating reflects light and reduces the possibility of photochemically induced chemical reactions occurring in the high pressure gaseous materials contained within the microspheres.

The process and apparatus of the present invention provide a practical and economical means by which gaseous materials can be encapsulated at high pressures in an economical and efficient manner to provide easy and practical means for handling and storage of gaseous materials. The present invention also allows the economical production of hollow glass microspheres from a low or high melting temperature glass composition in which a toxic, unstable and/or corrosive gaseous material can be safely maintained at high pressures. The apparatus and process of the present invention provide for the production of hollow glass microspheres at economic prices and in large quantities. The hollow glass microspheres of the present invention can be used in the design of systems for the handling and storage of gaseous materials at high pressures.

The process and apparatus of the present invention, as compared to the prior art processes of using a latent liquid or solid blowing agent, can be conducted at higher temperatures since there is no included expandable and/or decomposable blowing agent used. The ability to use higher blowing temperatures results in for particular glass compositions a lower glass viscosity which allows surface tension forces to produce significantly greater uniformity in wall thickness, sphericity and diameter of the microspheres produced.

The process and apparatus of the present invention allow the use of a wide variety of blowing gases and blowing gas materials to be used and encapsulated including metal vapors, dispersed metal particles and organo metal compounds.

In addition, the surface of the hollow glass microspheres, because of the method by which they are made, do not have, i.e. are free of sealing tips.

BRIEF DESCRIPTION OF THE DRAWINGS

The attached drawings illustrate exemplary forms of the method and apparatus of the present invention for making microspheres for use in compressing gases at high pressure in a contained volume.

The FIG. 1 of the drawings shows in cross-section an apparatus having multiple coaxial blowing nozzle means for supplying the gaseous materials for blowing hollow glass microspheres, a transverse jet providing an entraining fluid to assist in the formation and detachment of the microspheres from the blowing nozzles, and means for supplying a quench fluid to cool the microspheres.

Figure 1:
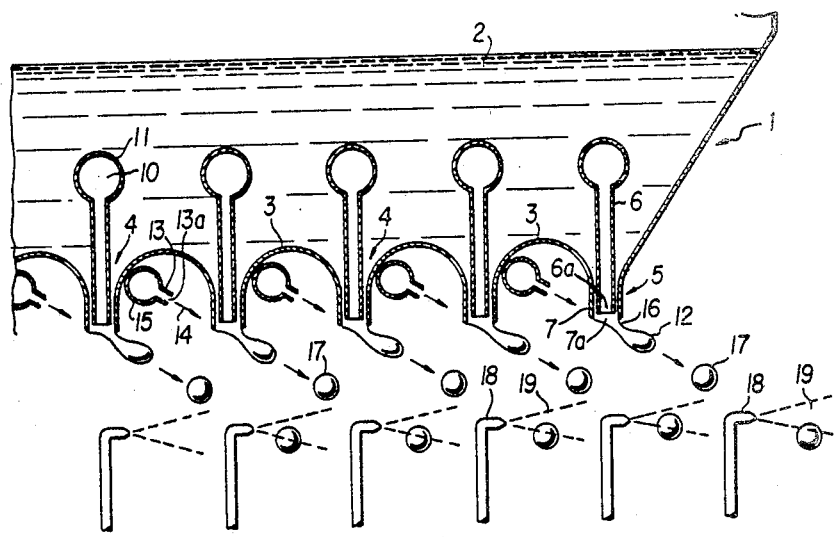
Figure 2:
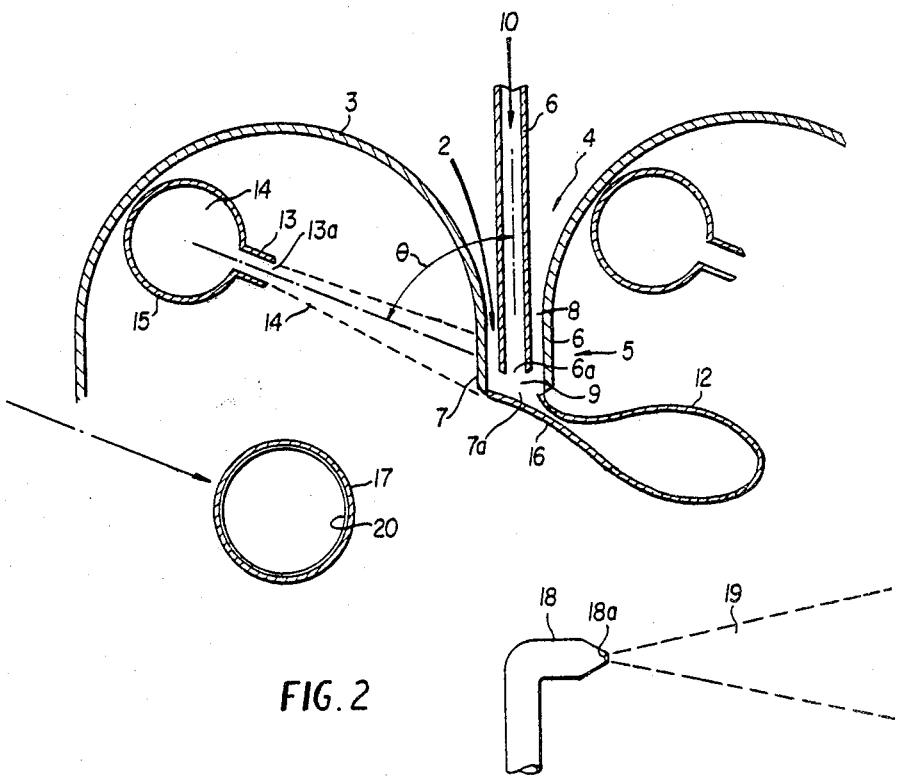

The FIG. 2 of the drawings is an enlarged detailed cross-section of the nozzle means of apparatus shown in FIG. 1.

The FIG. 3a of the drawings is a detailed cross-section of a modified form of the nozzle means shown in FIG. 2 in which the lower end of the nozzle means is tapered inwardly and showing a detailed cross-section of a modified transverse jet entraining means having a flattened orifice opening.

The FIG. 3b of the drawings is a top plane view of the modified transverse jet entraining means and the nozzle means illustrated in FIG. 3a of the drawings.

The FIG. 3c of the drawings illustrates the use of the apparatus of FIG. 3b to make filamented hollow glass microspheres.

DETAILED DISCUSSION OF THE DRAWINGS

The invention will be described with reference to the accompanying Figures of the drawings wherein like numbers designate like parts throughout the several views.

Referring to FIGS. 1 and 2 of the drawings, there is illustrated a vessel 1, made of suitable refractory material and heated by means not shown for holding molten glass 2. The bottom floor 3 of vessel 1 contains a plurality of openings 4 through which molten glass 2 is fed to coaxial blowing nozzles 5. The coaxial blowing nozzle 5 can be made separately or can be formed by a down-wide extension of the bottom 3 of vessel 1. The coaxial blowing nozzle 5 consists of an inner nozzle 6 having an orifice 6a for a gaseous material blowing gas and/or metal vapor and an outer nozzle 7 having an orifice 7a for molten glass. The inner nozzle 6 is disposed within and coaxial to outer nozzle 7 to form annular space 8 between nozzles 6 and 7, which annular space provides a flow path for molten glass 2. The orifice 6a of inner nozzle 6 terminates at or a short distance above the plane of orifice 7a of outer nozzle 7.

The molten glass 2 at about atmospheric pressure or at elevated pressure flows downwardly through annular space 8 and fills the area between orifices 6a and 7a. The surface tension forces in molten glass 2 form a thin liquid molten glass film 9 across orifices 6a and 7a.

A gaseous material blowing gas 10, and/or a gas containing a metal vapor, dispersed metal particles or an organo metal compound which is at or below ambient temperature or which is heated by means not shown to about the temperature of the molten glass and which is at a pressure above the molten glass pressure at the blowing nozzle, is fed through distribution conduit 11 and inner coaxial nozzle 6 and brought into contact with the inner surface of molten glass film 9. The gaseous material blowing gas exerts a positive pressure on the molten glass film to blow and distend the film outwardly to form an elongated cylinder shaped liquid film 12 of molten glass filled with the inert blowing gas and/or metal vapor 10. The elongated cylinder 12 is closed at its outer end and is connected at its inner end to outer nozzle 7 at the peripheral edge of orifice 7a. A balancing pressure of an inert gas, i.e. a slightly lower pressure, is provided in the area of the blowing nozzle 10 into which the elongated cylinder shaped liquid film is blown.

The illustrated coaxial nozzle, FIG. 2, can be used to produce microspheres having diameters three to five times the size of the inside diameter of orifice 7a and is useful in blowing low viscosity glass materials, i.e. glass compositions at low viscosities.

A transverse jet 13 is used to direct an inert entraining fluid 14, which is heated to about, below or above the temperature of the molten glass 2, by means not shown. The entraining fluid 14 is fed through distribution conduit 15, nozzle 13 and transverse jet nozzle orifice 13a and directed at the coaxial blowing nozzle 5. The transverse jet 13 is aligned to direct the flow of entraining fluid 14 over and around blowing nozzle 7 in the microsphere forming region at and behind the orifice 7a. The entraining fluid 14 as it passes over and around blowing nozzle 5 fluid dynamically induces a pulsating or fluctuating pressure field in the entraining fluid 14 at the opposite or lee side of blowing nozzle 5 in its wake or shadow.

The entraining fluid 14 envelops and acts on the elongated cylinder 12 in such a manner as to cause the cylinder to flap, fold, pinch and close-off at its inner end at a point 16 proximate to the orifice 7a of outer nozzle 7. The continued movement of the entraining fluid 14 over the elongated cylinder 12 produces fluid drag forces on the cylinder 12 and detaches it from the orifice 7a of the outer nozzle 7 to allow the cylinder to fall, i.e. to be entrained and transported away from nozzle 7. The surface tension forces of the molten glass act on the entrained, falling elongated cylinder 12 and cause the cylinder to seek a minimum surface area and to form a spherical shape hollow molten glass microsphere 17.

Quench nozzles 18 having orifices 18a are disposed below and on both sides of coaxial blowing nozzle 5 and direct cooling fluid 19 at and into contact with the molten glass microsphere 17 to rapidly cool and solidify the molten glass and form a hard, smooth hollow glass microsphere. The quench fluid 19 also serves to carry the hollow glass microsphere away from the coaxial blowing nozzle 5. Where a metal vapor is used with the blowing gas, the quench fluid cools and condenses the metal vapor to deposit the metal vapor on the inner wall surface of the microsphere as a transparent or a reflective metal coating 20. Additional cooling time, if necessary, can be provided by using a fluidized bed, liquid carrier or belt carrier system for the hollow glass microspheres to harden the microspheres with substantially little or no distortion or effect on the size or shape of the microspheres. The cooled and solidified hollow glass microspheres are collected by suitable means not shown.

The FIG. 3a of the drawings illustrates a preferred embodiment of the invention in which the lower portion of the outer coaxial nozzle 7 is tapered downwardly and inwardly at 21. This embodiment as in the previous embodiment comprises coaxial blowing nozzle 5 which consists of inner nozzle 6 with orifice 6a and outer nozzle 7 with orifice 7a'. The Figure of the drawings also shows elongated cylinder shaped liquid film 12 with a pinched portion 16.

The use of the tapered nozzle 21 construction was found to substantially assist in the formation of a thin molten glass film 9' in the area between orifice 6a of inner nozzle 6 and orifice 7a' of outer nozzle 7. The inner wall surface 22 of the taper portion 21 of the outer nozzle 7 when pressure is applied to molten glass 2 forces the molten glass 2 to squeeze through a fine gap formed between the outer edge of orifice 6a, i.e. the outer edge of inner nozzle 6, and the inner surface 22 to form the thin molten glass film 9' across orifices 6a and 7a'. Thus, the formation of the molten film 9 does not in this embodiment rely solely on the surface tension properties of the molten glass.

The illustrated coaxial nozzle can be used to produce microspheres having diameters three to five times the size of the diameter of orifice 7a of coaxial nozzle 7 and allows making microspheres of smaller diameter than those made using in FIG. 2 apparatus and is particularly useful in blowing high viscosity glass materials.

The diameter of the microsphere is determined by the diameter of orifice 7a'. This apparatus allows the use of larger inner diameters of outer nozzle 7 and larger inner diameters of inner nozzle 6, both of which reduce the possibility of plugging of the coaxial nozzles when in use. These features are particularly advantageous when the blowing gas contains dispersed metal particles and/or the glass compositions contain additive material particles.

The FIGS. 3a and 3b of the drawings illustrate another preferred embodiment of the invention in which the outer portion of the transverse jet 13 is flattened to form a generally rectangular or oval shaped orifice opening 13a. The orifice opening 13a can be disposed at an angle relative to a line drawn through the central axis of coaxial nozzle 5. The preferred angle, however, is that as illustrated in the drawing. That is, at an angle of about 90° to the central axis of the coaxial nozzle 5.

The use of the flattened transverse jet entraining fluid was found, at a given velocity, to concentrate the effect of the fluctuating pressure field and to increase the amplitude of the pressure fluctuations induced in the region of the formation of the hollow microspheres at the opposite or lee side of the blowing nozzle 5. By the use of the flattened transverse jet and increasing the amplitude of the pressure fluctuations, the pinching action exerted on the cylinder 12 is increased. This action facilitates the closing off of the cylinder 12 at its inner pinched end 16 and detaching of the cylinder 13 from the orifice 7a of the center nozzle 7.

The FIG. 3c of the drawings illustrates another preferred embodiment of the present invention in which a high viscosity glass material is used to blow hollow glass filamented microspheres. In this Figure, the elongated shaped cylinder 12 and glass microspheres 17a, 17b and 17c are connected to each other by thin glass filaments 17d. As can be seen in the drawing, as the microspheres 17a, 17b and 17c progress away from blowing nozzle 5 surface tension forces act on the elongated cylinder 12 to effect the gradual change of the elongated shaped cylinder 12 to the generally spherical shape 17a, more spherical shape 17b and finally the spherical shape microsphere 17c. The same surface tension forces cause a gradual reduction in the diameter of the connecting filaments 17d, as the distance between the microspheres and filaments and the blowing nozzle 5 increases. The hollow glass microspheres 17a, 17b and 17c that are obtained are connected by thin filament portions 17d that are substantially of equal length and that are continuous with the glass microsphere.

The operation of the apparatus illustrated in FIGS. 3a, 3b and 3c is otherwise essentially the same as that discussed above with regard to FIGS. 1 and 2 of the drawings.

The embodiments of the invention illustrated in the Figures of the drawings can be used singly or in various combinations as the situation may require. The entire apparatus can be enclosed in a high pressure containment vessel, not shown, which allows the process to be carried out at elevated pressures.

INORGANIC FILM FORMING MATERIAL AND GLASS COMPOSITIONS

The inorganic film forming material and compositions and particularly the glass compositions from which the hollow glass microspheres of the present invention are made can be widely varied to obtain the desired physical characteristics for heating, blowing, forming, cooling and hardening the microspheres and the desired strength, gas permeability and light transmission characteristics of the glass microspheres produced.

The constituents of the glass compositions can be selected and blended to have high resistance to corrosive gaseous materials, high resistance to gaseous chemical agents, high resistance to alkali and weather, low susceptibility to diffusion of gaseous materials into and out of the glass microspheres, to be free of trapped gas bubbles or dissolved gases in the walls of the microspheres which can form bubbles and to have sufficient strength when cooled, hardened and solidified to, when the microsphere contains a gaseous material compressed under very high pressure, withstand the contained pressure. The molten glass composition forms hard microspheres which are capable of contacting adjacent microspheres without significant wear or deterioration at the points of contact and are resistant to deterioration from exposure to moisture, heat and/or weathering.

The constituents of the glass compositions can vary widely, depending on the intended end uses, and can include naturally occurring and synthetically produced glass materials.

The glass compositions preferably contain relatively large amounts of silicon dioxide, alumina, lithium, zirconia, and lime and relatively small amounts of soda. Calcium can be added to assist in melting the glass and boric oxide can be added to improve the weathering properties of the glass. The glass compositions are formulated to have relatively high melting and fluid flow temperatures with a relatively narrow temperature difference between the melting and fluid flow temperatures. The glass compositions are formulated such that they have a high rate of viscosity increase with decreasing temperature so that the microsphere walls will solidify, harden and strengthen before the blowing glass within the sphere decreases in volume and pressure a sufficient amount to cause the microsphere to collapse. Where it is desirous to maintain a high pressure in the contained volume of the microspheres, the permeability to gases such as helium (ambient) requires a reduction of the network formers, such as silica, and the inclusion of network modifiers, such as alumina. Other means for decreasing the permeability of the hollow glass microspheres to gases, for example by the addition of plane-orientable laminal flow particles, are discussed below.

The glass compositions suitable for use in the present invention can have the range of proportions of the constituents listed below in Columns A, B and C, in percent by weight.

TABLE 1

|  | A (Alumina) | B (Lithium) | C (Zirconia) |
|---|---|---|---|
| $SiO_2$ | 46–64 | 58–85 | 40–48 |
| $Al_2O_3$ | 10–22 | 0–25 | 6–12 |
| $Li_2O$ | — | 8–25 | — |
| Zirconia | — | — | 8–20 |
| CaO | 5–18 | 0–2 | 1–3 |
| MgO | 0–12 | 0–2 | 0–4 |
| $B_2O_3$ | 4–12 | 2–6 | 0–6 |
| $Na_2O$ | 0–1 | 0–1.0 | 0–2.5 |
| BaO | 0–2.0 | 0–2.0 | 0–2.0 |
| $CaF_2$ | 0–2.0 | 0–2.0 | 0–2.0 |
| $K_2O$ | 0–0.7 | 0–0.7 | 0.5–1.5 |

The compositions of Columns A and B do not contain zirconia whereas the compositions of Column C are relatively high in zirconia content.

The Column A glass compositions can be used for containing under high pressure gases such as oxygen, hydrogen, nitrogen, carbon monoxide, carbon dioxide, ammonia, acetylene, methane, and natural gas.

The Column B glass compositions can be used for containing under high pressure gases such as helium, hydrogen, deuterium, tritium, argon and neon. These glass compositions are, however, particularly useful for containing inertial confinement fusion fuel target gases such as deuterium, tritium, and mixtures thereof inasmuch as the Column B glass compositions are substantially resistant to diffusion of gases into and/or out of the glass microspheres and are of low average atomic number.

The Column C glass compositions can be used for containing under high pressure gases such as xenon, radon, krypton, argon, deuterium and tritium. These glass compositions are also particularly useful for the storage of atomic fuel waste gaseous products. The microspheres made from the Column C glass compositions can be stored in concrete or geological storage facilities inasmuch as the compositions are resistant to attack by alkali.

The use of glass compositions containing a relatively high alumina content and a relatively low soda content was found to produce a rapid hardening of the glass microspheres, which facilitated the production of the glass microspheres.

The Table 2 below shows in Column I a high alumina content glass composition of the present invention and in Column II a high soda content glass composition heretofore used to make glass microspheres.

The glass microspheres made from the Columns I and II glass composition are made in accordance with the present invention by blowing the glass with nitrogen as the blowing gas.

TABLE 2

|  | I (Alumina) | II (Soda) |
|---|---|---|
| $SiO_2$ | 57.0 | 72.2 |
| $Al_2O_3$ | 20.5 | 1.2 |
| CaO | 5.5 | 8.8 |
| MgO | 12 | 3.3 |
| $B_2O_3$ | 4 | — |

TABLE 2-continued

|  | I (Alumina) | II (Soda) |
|---|---|---|
| Na$_2$O | 1.0 | 14.2 |

The Table 3 below compares the increase in viscosity on cooling of the high alumina content (I) and the high soda content (II) glass compositions of Table 2.

TABLE 3

|  | Temperature | Viscosity-Poises |
|---|---|---|
| High Alumina Comp. | 2700° F. | 30 |
| (I) | 1830° F. | 10 × 10$^5$ |
|  | 1470° F. | 10 × 10$^{10}$ |
| High Soda Comp. | 2700° F. | 100 |
| (II) | 1830° F. | 10 × 10$^3$ |
|  | 1470° F. | 10 × 10$^5$ |

The Table 3 shows that the high alumina content glass has a substantially faster hardening rate than the high soda content glass such that in the first 1300° F. of chilling, the high alumina content glass had a viscosity of 10×10$^5$ times greater than that of the high soda content glass.

For certain uses relatively low temperature melting glass compositions can be used. The low melting glass compositions can contain relatively large amounts of lead. Naturally occurring glass materials such as basaltic mineral compositions can also be used. The use of these naturally occurring glass compositions can in some cases substantially reduce the cost of the raw materials used.

Suitable lead containing glass compositions and basaltic mineral compositions are in Table 4.

TABLE 4

|  | D (Lead) | E (Basalt)* |
|---|---|---|
| SiO$_2$ | 30–70 | 40–55 |
| Al$_2$O$_3$ | 0–2 | 13–17 |
| Pb | 10–60 | — |
| Fe$_2$O$_3$ | — | 2–16 |
| FeO | — | 1–12 |
| CaO | 0–5 | 7–14 |
| MgO | 0–3 | 4–12 |
| Na$_2$O | 0–9 | 2–4 |
| K$_2$O | 0–9 | 1–2 |
| H$_2$O | — | 0.5–4 |
| TiO$_2$ | — | 0.5–4 |

*See G.L. Sheldon, Forming Fibres from Basalt Rock, Platinum Metals Review, pages 18 to 34, 1978.

The discussions in the present application with respect to glass compositions is applicable to the various glass compositions mentioned including the naturally occurring basaltic mineral compositions.

To assist in the blowing and formation of the glass microspheres and to control the surface tension and viscosity of the spheres suitable surface active agents, such as colloidal particles of insoluble substances and viscosity stabilizers can be added to the glass compositions as additives. These additives can affect the viscosity of the surface film of the microsphere to stabilize the film during the microsphere formation.

A distinct and advantageous feature of the present invention is that latent solid or latent liquid blowing gases are not used or required and that the microspheres that are produced are free of latent solid or latent liquid blowing gas materials or gases.

The glass compositions from which the hollow glass microspheres can be made are, depending on the particular glass materials used, to some degree permeable to the gas materials used to blow the microspheres and/or to the gases present in the medium surrounding the microspheres. The gas permeability of the glass compositions can be controlled, modified and/or reduced or substantially eliminated by the addition, prior to blowing the microspheres, to the glass composition of very small inert laminal plane-orientable additive material particles. Suitable additive particles are copper, gold and aluminum leaf powders. When any one or more of these laminal plane-orientable additive material particles are added to a glass composition prior to the blowing and formation of the hollow glass microsphere, the process of making the microsphere aligns the laminal particles, as the glass film is stretched in passing, i.e. extruded, through the conical blowing nozzle, with the walls of the hollow glass microsphere and normal to the gas diffusion direction. The presence of the laminal plane particles in the microsphere walls substantially diminishes the gas permeability of the glass film. The sizes of the additive particles are advantageously selected to be less than one-half the thickness of the wall of the microspheres.

BLOWING GASES

The hollow microspheres, particularly the hollow glass microspheres can be blown with the desired blowing gas or with a gas containing a metal vapor, dispersed metal particles or an organo metal compound or mixtures thereof.

The desired gaseous material blowing gases are those for which ease in handling and storage are sought.

The process and apparatus of the present invention can be used to compress a wide variety of gaseous materials in hollow glass microspheres which greatly facilitate the handling, processing, use, storage and disposal of the gaseous materials.

The present invention can be used to obtain under pressure, contained in hollow glass microspheres, reusable gases such as oxygen, hydrogen, nitrogen, carbon monoxide, carbon dioxide, air, helium, ammonia, neon, and acetylene.

The gases can readily be released from the microspheres merely by feeding the microsphere in an enclosed container between two counter rotating small steel drums. Where the contained gas is used as a fuel, the microspheres can be fed directly into the combustion region. The surface of the drums can be slightly roughened so as to grasp and crush the microspheres and release the contained pressurized gases.

The microspheres can also be used to uniformly mix two chemical reactant gases, separately contained in microspheres, or a chemically reactant gas and a liquid prior to initiating the chemical reaction.

The present invention can be used to obtain under pressure, contained in hollow glass microspheres, poisonous, toxic, corrosive and radioactive waste gaseous materials. Because the gaseous materials can be compressed under high pressure in the contained volume of the microspheres, relatively large volumes of the gaseous materials can be contained in relatively small microspheres. The present invention avoids the use and need for heavy metal containers, complex valving systems and corrosion resistant alloys. The present invention finds particular and advantageous use in the handling and storage of poisonous gaseous materials such as hydrogen, cyanide, chlorine, bromine, and carbon monoxide gases and of radioactive waste gaseous materials such as radon, tritium, krypton and xenon. The use of the microspheres to contain the gaseous materials renders the toxic, corrosive and radioactive waste gaseous materials relatively safe and easy to handle. These materials can be safely stored, as appropriate, in steel or lead containers, geological formations or mixed with and stored in concrete.

The present invention can be used to obtain under pressure, contained in hollow glass microspheres, gaseous laser fuel materials such as tritium, deuterium, and mixtures thereof. The invention has particular utility in the manufacture of inertial confinement fuel targets for hydrogen fusion research and reactors.

The metal vapor when used in combination with the blowing gas can deposit a metal coating on the inner wall surface of the hollow glass microsphere. The thickness of and nature of the metal coating deposited will determine whether the metal coating is transparent or reflective of visible light.

The metal vapor when used with the blowing gas to blow the hollow glass microspheres is selected to have the desired vaporization temperature, latent heat capacity and vapor pressure at the blowing temperature, and to have the desired vapor pressure at the solidification temperature and ambient temperature. The condensing and depositing of the metal vapor within the hollow glass microsphere produces a vapor pressure of the metal vapor equivalent to the vapor pressure of the metal at room temperature, i.e. about zero vapor pressure. The overall pressure contained within the microsphere will be that of the blowing gas (after cooling), e.g. 100 to 1000 p.s.i.g. The thickness of the deposited metal coating will depend to some extent upon the metal vapor partial pressure in the gas used to blow the microsphere, the size of the microsphere and the temperature of the molten glass.

The metal vapors of metals such as zinc, antimony, barium, cadmium, bismuth, selenium, lithium, magnesium, and potassium can be used. Zinc and selenium, however, are preferred.

A blowing gas containing dispersed metal particles can be used to obtain in the contained volume of the microsphere a deposit of a thin metal coating on the inner wall surface of the hollow glass microsphere. The metal used to coat the inner wall surface of the hollow glass microspheres is selected to have the desired characteristics, and to adhere to the inner wall surface of the glass microspheres. The thickness of the deposited metal coating will depend to some extent upon the metal, the particle size of the metal used, the size of the microspheres and the amount of dispersed metal particles used.

The dispersed metal particle size can be 25 Å to 10,000 Å, preferably 50 Å to 5,000 Å and more preferably 100 Å to 1,000 Å. A sufficient amount of the metal is dispersed in the blowing gas to obtain the desired thickness of the deposited metal. The dispersed metal particles can advantageously be provided with an electrostatic charge to assist in depositing them on the inner wall surface of the microspheres.

Metal particles such as aluminum, silver, nickel, zinc, antimony, barium, cadmium, cesium, bismuth, selenium, lithium, magnesium, potassium, and gold can be used. Aluminum, zinc and nickel, however, are preferred. Dispersed metal oxide particles can in a similar manner be used to obtain similar effects to that of the metals.

The thin metal coating can also be deposited on the inner wall surface of the microsphere by using as or with blowing gas organo metal compounds that are gases at the blowing temperatures. Of the organo metal compounds available, the organo carbonyl compounds are preferred. Suitable organo metal carbonyl compounds are nickel and iron.

The organo metal compounds can be decomposed by heating just prior to blowing the microspheres to obtain finely dispersed metal particles and a decomposition product, e.g. a gas. The decomposition gas, if present, can be used to assist in blowing the microspheres. The dispersed metal particles from decomposition of the organo metal compound, as before, deposit to form the thin metal layer. Alternatively, the microsphere, after being formed and containing the gaseous organo metal compound blowing gas, can be subjected to an "electric discharge" means which decomposes the organo metal compound to form the finely dispersed metal particles and the decomposition product.

The thickness of the deposited metal layer will depend primarily on the partial pressure of the gaseous organo metal blowing gas and the inside diameter of the microsphere.

In each of the above discussed embodiments, the specific metal used as well as the thickness and nature of metal coating deposited will determine whether the metal coating is transparent or reflective of visible light.

Blowing gases can also be selected that react with the inorganic film forming material or composition, e.g. the glass microspheres, for example, to assist in the hardening of the microspheres or to make the microsphere less permeable to the contained blowing gases. The blowing gases can also be selected to react with the deposited thin metal layer.

A second blowing gas can advantageously be used in combination with the principle blowing gas to assist in the control of the cooling and solidification of the hollow molten glass microsphere, to react with the principle gas and/or to stabilize or initiate chemical degradation to a less toxic or less poisonous form such that the gaseous materials by passage of time become less hazardous. The auxiliary blowing gas can assist in the control of the cooling and solidification of the microspheres by maintaining the partial pressure of the auxiliary blowing gas in the microsphere for a sufficient period of time to allow the molten glass microsphere to solidify, harden and strengthen while the microsphere is cooled and hardened.

The entraining fluid can be a gas at a high or low temperature and can be selected to react with or be inert to the glass composition. The entraining fluid, e.g. an inert entraining fluid, can be a high temperature gas. Suitable entraining fluids are nitrogen, air, steam, argon and xenon.

The gas in the area surrounding the blowing nozzle can be any suitable inert gas such as those that can be used as the entraining fluid, e.g. nitrogen, air, argon, and xenon.

An important feature of the present invention is the use of the transverse jet to direct the inert entraining fluid over and around the coaxial blowing nozzle. The entraining fluid assists in the formation and detaching of the hollow molten glass microsphere from the coaxial blowing nozzle.

The quench fluid can be a liquid, a liquid dispersion or a gas. Suitable quench fluids are ethylene glycol vapor or liquid, steam, a fine water spray, air, nitrogen or mixtures thereof. The hollow molten glass microspheres immediately after they are formed are rapidly quenched and cooled to solidify, harden and strengthen the glass microspheres before the internal gas pressure is reduced to such a low value that the microsphere collapses. The selection of a specific quench fluid and quench temperature depends to some extent on the glass composition from which the microsphere was formed and on the blowing gas or metal vapor used to blow the microsphere and on the metal and nature of the deposited metal film desired.

PROCESS CONDITIONS

The inorganic film forming materials and/or compositions of the present invention are in liquid form at the desired blowing temperature and during the blowing operation. The inorganic film forming materials and/or compositions are heated to a temperature of about 1800° to 3100° F. and maintained in a liquid, fluid form during the blowing operation. The glass compositions are heated to a temperature of 2000° to 2800° F., preferably 2300° to 2750° F. and more preferably 2400° to 2700° F., depending on the constituents of the composition. The lead containing glass compositions can be heated to a temperature of, for example, about 1800° to 2900° F. The basaltic mineral glass compositions can be heated to a temperature of, for example, about 2100° to 3100° F.

The glass compositions at these temperatures, i.e. the blowing temperatures, is molten, fluid and flows easily. The molten glass just prior to the blowing operation has a viscosity of 10 to 600 poises, preferably 20 to 350 and more preferably 30 to 200 poises. The molten lead containing glass compositions just prior to the blowing operation have a viscosity of, for example, 10 to 500 poises. The molten basaltic mineral glass composition just prior to the blowing operation can have a viscosity of, for example, 15 to 400 poises.

Where the process is used to make non-filamented microspheres, the liquid glass just prior to the blowing operation can have a viscosity of 10 to 200 poises, preferably 20 to 100 poises, and more preferably 25 to 75 poises.

Where the process is used to make filamented microspheres, the liquid glass just prior to the blowing operation can have a viscosity of 50 to 600 poises, preferably 100 to 400 poises, and more preferably 150 to 300 poises.

A critical feature of the present invention is that the formation of the hollow microspheres can be carried out at low viscosities relative to the viscosities heretofore used in the prior art processes that utilized latent liquid or solid blowing agents dispersed throughout or contained in the glass compositions used to blow the microspheres. Because of the ability to utilize comparatively low viscosities, applicant is able to obtain hollow glass microspheres, the walls of which are free of any entrapped or dissolved gases or bubbles. With the low viscosities used by applicant, any entrapped or dissolved gases diffuse out and escape from the glass film surface during the bubble formation. With the high viscosities required to be used in the prior are processes, any dissolved gases or bubbles are trapped in the walls of the glass microspheres as they are formed because of the high viscosities required to be used.

The glass during the blowing operation exhibits a surface tension of 150 to 400 dynes/cm, preferably 200 to 350 dynes/cm and more preferably 250 to 325 dynes/cm.

The molten glass fed to the coaxial blowing nozzle can be at ambient pressure or can be at an elevated pressure. The molten or liquid glass feed can be at a pressure of 1 to 20,000 p.s.i.g., usually 3 to 10,000 p.s.i.g. and more usually 5 to 5,000 p.s.i.g. Where the process is used to encapsulate gases at elevated pressures, the molten glass can be at a pressure of 1 to 15,000 p.s.i.g., preferably 100 to 6,000 p.s.i.g. and more preferably 500 to 3,000 p.s.i.g. The molten glass is continuously fed to the coaxial blowing nozzle during the blowing operation to prevent premature breaking and detaching of the elongated cylinder shaped molten glass liquid film as it is being formed by the blowing gas.

The blowing gas, gaseous material blowing gas and metal vapor, dispersed metal particles or organo metal compound can be at about the same temperature as the molten glass being blown. The gaseous material blowing gas temperature can, however, be at a higher temperature than the molten glass to assist in maintaining the fluidity of the hollow molten glass microsphere during the blowing operation or can be at a lower temperature than the molten glass to assist in the solidification and hardening of the hollow molten glass microsphere as it is formed.

The pressure of the gaseous material blowing gas or gaseous material blowing gas including metal vapor, dispersed metal particles or organo metal compounds is sufficient to blow the microsphere and will be slightly above the pressure of molten glass at the orifice 7a of the outer nozzle 7. The gaseous material blowing gas can be at a pressure of 1 to 20,000 p.s.i.g., usually 3 to 10,000 p.s.i.g. and more usually 5 to 5,000 p.s.i.g. The gaseous material when used to encapsulate gases at elevated pressures can also be at a pressure of 1 to 15,000 p.s.i.g., preferably 100 to 6,000 p.s.i.g. and more preferably 500 to 3,000 p.s.i.g. Depending on the particular gaseous material blowing gas used, the blowing gas or gaseous material blowing gas can be at a pressure of 50 to 20,000 p.s.i.g., preferably more than 100, e.g. 200 to 10,000 p.s.i.g. and more preferably 500 to 5,000 p.s.i.g. The blowing gas pressure will also depend on and be slightly above the ambient pressure external to the blowing nozzle.

The pressure of the gaseous material blowing gas is sufficient to blow the microsphere and will be slightly above the pressure of the liquid glass at the orifice 7a of the outer nozzle 7.

The temperature of the gaseous material blowing gas will of course also depend on what the material is and its chemical decomposition temperature and will be below its decomposition temperature. The blowing gas temperature will also depend on the viscosity-temperature-shear relationship of the glass materials used to make the microspheres. The temperature is obviously not a problem with gaseous materials which are themselves one of the basic elements.

The metal vapor blowing gas temperature will be sufficient to vaporize the metal and will be at about the same temperature as the molten glass being blown. The metal vapor blowing gas temperature can, however, be at a higher temperature than the molten glass to assist in maintaining the fluidity of the hollow molten glass microsphere during the blowing operation or can be at a lower temperature than the molten glass to assist in the solidification and hardening of the hollow molten galss microsphere as it is formed. The pressure of the metal vapor blowing gas is sufficient in combination with the principle blowing gas to blow the microsphere and will be slightly above the pressure of molten glass at the orifice 7a of the outer nozzle 7. The pressure of the combined mixture of the blowing gases will also depend on and be slightly above the ambient pressure external to the blowing nozzle.

The ambient pressure external to the blowing nozzle can be at about atmospheric pressure or can be at superatmospheric pressure. Where it is desired to have a relatively or high pressure of contained gas in the microsphere or to deposit a relatively thick coating of metal within a microsphere, the ambient pressure external to the blowing nozzle is maintained at a superatmospheric pressure. The ambient pressure external to the blowing nozzle will be such that it substantially balances i.e. is about equal to, but is slightly less than the blowing gas pressure. Thus, the ambient gas pressure external to the blowing nozzle will be about but slightly less than 1 to 15,000 p.s.i.g., preferably 100 to 6,000 p.s.i.g. and more preferably 500 to 3,000 p.s.i.g. The ambient pressure can also be about but slightly less than 50 to 20,000 p.s.i.g., preferably 100, e.g. 200, to 10,000 p.s.i.g. and more preferably 500 to 5,000 p.s.i.g.

The transverse jet inert entraining fluid which is directed over and around the coaxial blowing nozzle to assist in the formation and detaching of the hollow molten glass microsphere from the coaxial blowing nozzle can be at about the temperature of the molten glass being blown. The entraining fluid can, however, be at a higher temperature than the molten glass to assist in maintaining the fluidity of the hollow molten glass microsphere during the blowing operation or can be at a lower temperature than the molten glass to assist in the stabilization of the forming film and the solidification and hardening of the hollow molten glass microsphere as it is formed.

The transverse jet entraining fluid can have a linear velocity in the region of microsphere formation of 1 to 120 ft/sec, usually 5 to 80 ft/sec and more usually 10 to 60 ft/sec.

Where the process if used to make nonfilamented microspheres, the linear velocity of the transverse jet fluid in the region of microsphere formation can be 30 to 120 ft/sec, preferably 40 to 100 ft/sec and more preferably 50 to 80 ft/sec.

Where the process is used to make filamented microspheres, the linear velocity of the transverse jet fluid in the region of microsphere formation can be 1 to 50 ft/sec, preferably 5 to 40 ft/sec and more preferably 10 to 30 ft/sec.

Further, it is found (FIGS. 2 to 4) that pulsing the transverse jet entraining fluid at a rate of 2 to 1500 pulses/sec, preferably 50 to 1000 pulses/sec and more preferably 100 to 500 pulses/sec assists in controlling the diameter of the microspheres and the length of the filament portion of the filamented microspheres and detaching the microspheres from the coaxial blowing nozzle.

The distance between filamented microspheres depends to some extent on the viscosity of the glass and the linear velocity of the transverse jet entraining fluid.

The quench fluid is at a temperature such that it rapidly cools the hollow molten glass microsphere to solidify, harden and strengthen the molten glass before the inner gas pressure or metal vapor pressure decreases to a value at which the glass microsphere would collapse. The quench fluid can be at a temperature of 0° to 500° F., preferably 40° to 200° F. and more preferably 50° to 100° F., depending to some extent on the glass composition.

The quench fluid very rapidly cools the outer molten glass surface of the microsphere with which it is in direct contact and more slowly cools the blowing gas or metal vapor enclosed within the microsphere because of the lower thermal conductivity of the gas or vapor. This cooling process allows sufficient time for the glass walls of the microspheres to strengthen before the gas is cooled and/or the metal vapor is cooled and the pressure within the glass microsphere is substantially reduced.

The time elapsed from commencement of the blowing of the glass microspheres to the cooling and hardening of the microspheres can be 0.0001 to 1.0 second, preferably 0.0010 to 0.50 second and more preferably 0.010 to 0.10 second.

The filamented microsphere embodiment of the invention provides a means by which the microspheres may be suspended and allowed to harden and strengthen without being brought into contact with any surface. The filamented microspheres are simply drawn on a blanket or drum and are suspended between the blowing nozzle and the blanket or drum for a sufficient period of time for them to harden and strengthen.

APPARATUS

Referring to FIGS. 1 and 2 of the drawings, the refractory vessel 1 is constructed to maintain the molten glass at the desired operating temperatures. The molten glass 2 is fed to coaxial blowing nozzle 5. The coaxial blowing nozzle 5 consists of an inner nozzle 6 having an outside diameter of 0.32 to 0.010 inch, preferably 0.20 to 0.015 inch and more preferably 0.10 to 0.020 inch and an outer nozzle 7 having an inside diameter of 0.420 to 0.020 inch, preferably 0.260 to 0.025 and more preferably 0.130 to 0.030 inch. The inner nozzle 6 and outer nozzle 7 form annular space 8 which provides a flow path through which the molten glass 2 is extruded. The distance between the inner nozzle 6 and outer nozzle 7 can be 0.050 to 0.004, preferably 0.030 to 0.005 and more preferably 0.015 to 0.008 inch.

The orifice 6a of inner nozzle 6 terminates a short distance above the plane of orifice 7a of outer nozzle 7. The orifice 6a can be spaced above orifice 7a at a distance of 0.001 to 0.125 inch, preferably 0.002 to 0.050 inch and more preferably 0.003 to 0.025 inch. The molten glass 2 flows downwardly through annular space 8 and fills the area between orifices 6a and 7a. The orifices 6a and 7a can be made from stainless steel, platinum alloys, or fused alumina. The surface tension forces in the molten glass 2 form a thin liquid molten glass film 9 across orifices 6a and 7a which has about the same or a smaller thickness as the distance of orifice 6a is spaced above orifice 7a. The molten glass film 9 can be 25 to 3175 microns, preferably 50 to 1270 microns and more preferably 76 to 635 microns thick.

A gaseous material blowing gas is fed through inner coaxial nozzle 6 and brought into contact with the inner surface of molten glass film 9. The blowing gas and/or metal vapor exerts a positive pressure on the molten glass film to blow and distend the film outwardly and downwardly to form an elongated cylinder shaped liquid film 12 of molten glass filled with the blowing gas 10. The elongated cylinder 12 is closed at its outer end and is connected to outer nozzle 7 at the peripheral edge of orifice 7a.

The FIG. 2 blowing nozzle can be used to blow molten glass at relatively low viscosities, for example, of 10 to 60 poises, and to blow hollow glass microspheres of relatively thick wall size, for example, of 20 to 100 microns or more.

The transverse jet 13 is used to direct an inert entraining fluid 14 through nozzle 13 and transverse jet nozzle orifice 13a at the coaxial blowing nozzle 5. The coaxial blowing nozzle 5 has an outer diameter of 0.52 to 0.030 inch, preferably 0.36 to 0.035 inch and more preferably 0.140 to 0.040 inch.

The process of the present invention was found to be very sensitive to the distance of the transverse jet 13 from the orifice 7a of outer nozzle 7, the angle at which the transverse jet was directed at coaxial blowing nozzle 5 and the point at which a line drawn through the center axis of transverse jet 13 intersects with a line drawn through the center axis of coaxial nozzle 5. The transverse jet 13 is aligned to direct the flow of entraining fluid 14 over and around outer nozzle 7 in the microsphere forming region of the orifice 7a. The orifice 13a of transverse jet 13 is located a distance of 0.5 to 14 times, preferably 1 to 10 times and more preferably 1.5 to 8 times and still more preferably 1.5 to 4 times the outside diameter of coaxial blowing nozzle 5 away from the point of intersect of a line drawn along the center axis of transverse jet 13 and a line drawn along the center axis of coaxial blowing nozzle 5. The center axis of transverse jet 13 is aligned at an angle of 15° to 85°, preferably 25° to 75° and more preferably 35° to 55° relative to the center axis of the coaxial blowing nozzle 5. The orifice 13a can be circular in shape and have an inside diameter of 0.32 to 0.010 inch, preferably 0.20 to 0.015 inch and more preferably 0.10 to 0.020 inch.

The line drawn through the center axis of transverse jet 13 intersects the line drawn through the center axis of coaxial blowing nozzle 5 at a point above the orifice 7a of outer nozzle 7 which is 0.5 to 4 times, preferably 1.0 to 3.5 times and more preferably 2 to 3 times the outside diameter of the coaxial blowing nozzle 5. The transverse jet entraining fluid acts on the elongated shaped cylinder 12 to flap and pinch it closed and to detach it form the orifice 7a of the outer nozzle 7 to allow the cylinder to fall free, i.e. be transported away from the outer nozzle 7 by the entraining fluid.

The transverse jet entraining fluid as it passes over and around the blowing nozzle fluid dynamically induces a periodic pulsating or fluctuating pressure field at the opposite or lee side of the blowing nozzle in the wake or shadow of the coaxial blowing nozzle. A similar periodic pulsating or fluctuating pressure field can be produced by a pulsating sonic pressure field directed at the coaxial blowing nozzle. The entraining fluid assists in the formation and detaching of the hollow glass microsphere from the coaxial blowing nozzle. The use of the transverse jet and entraining fluid in the manner described also discourages wetting of the outer wall surface of the coaxial blowing nozzle 5 by the molten glass being blown. The wetting of the outer wall can otherwise disrupt and interfer with blowing the microsphere.

The quench nozzles 18 are disposed below and on both sides of coaxial blowing nozzle 5 a sufficient distance apart to allow the microspheres 17 to fall between the quench nozzles 18. The inside diameter of quench nozzle orifice 18a can be 0.1 to 0.75 inch, preferably 0.2 to 0.6 inch and more preferably 0.3 to 0.5 inch. The quench nozzles 18 direct cooling fluid 19 at and into contact with the molten glass microspheres 17 at a velocity of 2 to 14, preferably 3 to 10 and more preferably 4 to 8 ft/sec to rapidly cool and solidify the molten glass and form a hard, smooth hollow glass microsphere.

The FIG. 3a of the drawings illustrates a preferred embodiment of the invention. It is found that in blowing high viscosity molten glass compositions, i.e. molten glass compositions at high viscosities, that it was advantageous to immediately prior to blowing the molten glass to provide by extrusion a very thin molten glass liquid film for blowing into the elongated cylinder shape liquid film 12. The thin molten glass liquid film 9' is provided by having the lower portion of the outer coaxial nozzle 7 tapered downwardly and inwardly at 21. The tapered portion 21 and inner wall surface 22 thereof can be at an angle of 15° to 75°, preferably 30° to 60° and more preferably about 45° relative to the center axis of coaxial blowing nozzle 5. The orifice 7a' can be 0.10 to 1.5 times, preferably 0.20 to 1.1 times and more preferably 0.25 to 0.8 times the inner diameter of orifice 6a of inner nozzle 6.

The thickness of the molten glass liquid film 9' can be varied by adjusting the distance of orifice 6a of inner nozzle 6 above orifice 7a of outer nozzle 7 such that the distance between the peripheral edge of orifice 6a and the inner wall surface 22 of tapered nozzle 21 can be varied. By controlling the distance between the peripheral edge of orifice 6a and the inner wall surface 22 of the tapered nozzle to form a very fine gap and by controlling the pressure applied to feed the molten glass 2 through annular space 8 the molten glass 2 can be squeezed and extruded through the vary fine gap to form a relatively thin molten glass liquid film 9'.

The proper gap can best be determined by pressing the inner coaxial nozzle 6 downward with sufficient pressure to completely block-off the flow of glass, and to then very slowly raise the inner coaxial nozzle 6 until a stable system is obtained, i.e. until the microspheres are being formed.

The tapered nozzle construction illustrated in FIG. 3a is as mentioned above the preferred embodiment of the invention. This embodiment can be used to blow glass compositions at relatively high viscosities as well as to blow glass compositions at the relatively low viscosities referred to with regard to FIG. 2 of the drawings. The FIG. 3a embodiment of the invention is of particular advantage in blowing the thin walled microspheres.

When blowing high viscosity glass compositions, it was found to be advantageous to obtain the very thin molten glass fluid film and to continue during the blowing operation to supply molten glass to the elongated cylinder shaped liquid film as it was formed. Where a high pressure is used to squeeze, i.e. extrude, the molten glass through the very thin gap, the pressure of the blowing gas and/or blowing gas and metal vapor is generally less than the molten glass feed pressure, but slightly above the pressure of the molten glass at the coaxial blowing nozzle.

The tapered nozzle configuration of FIG. 3a is also particularly useful in aligning the laminal plane-orientable glass additive materials. The passage of the glass material through the fine or narrow gap serves to align the additive materials with the walls of the microspheres as the microspheres are being formed.

The FIGS. 3a and 3b of the drawings also illustrate a preferred embodiment of the invention in which the transverse jet 13 is flattened to form a generally rectangular or oval shape. The orifice 13a can also be flattened to form a generally oval or rectangular shape. The width of the orifice can be 0.96 to 0.030 inch, preferably 0.60 to 0.045 inch and more preferably 0.30 to 0.060 inch. The height of the orifice can be 0.32 to 0.010 inch, preferably 0.20 to 0.015 inch and more preferably 0.10 to 0.020 inch.

The FIG. 3c of the drawings illustrates an embodiment of the present invention in which a glass material or composition at high viscosity is used to blow filamented hollow glass microspheres. The drawing shows the formation of the uniform diameter microspheres spaced about equal distances apart. The numbered items in this drawing have the same meanings as discussed above with reference to FIGS. 1, 2, 3a and 3b.

DESCRIPTION OF THE MICROSPHERES

The hollow microspheres made in accordance with the present invention can be made from a wide variety of inorganic film forming materials and compositions, particularly glass compositions.

The hollow microspheres made in accordance with the present invention can be made from suitable inorganic film forming compositions. The compositions are preferably resistant to high temperatures and chemical attack, resistant to corrosive and alkali and resistant to weathering as the situation may require.

The inorganic film forming compositions that can be used are those that have the necessary viscosities, as mentioned above, when being blown to form stable films and which have a rapid change from the molten or liquid state to the solid or hard state with a relatively narrow temperature change. That is, they change from liquid to solid within a relatively narrowly defined temperature range.

The hollow glass microspheres made in accordance with the present invention are preferably made from glass compositions. The glass microspheres are substantially uniform in diameter and wall thickness, and have a clear, hard, smooth surface. The walls of the microspheres are free of any holes and substantially free of any relatively thinned wall portions or sections, sealing tips, trapped gas bubbles or sufficient amounts of dissolved gases to form bubbles. The microspheres are also free of any latent solid or liquid blowing gas materials or gases. The preferred glass compositions are those that are resistant to alkali, chemical attack, high temperatures, weathering and diffusion of gases into and/or out of the microspheres. Where the gases to be encapsulated may decompose at elevated temperatures, glass compositions that are molten below the decomposition temperatures of the gases can be used.

The microspheres after being formed can be reheated to soften the glass and enlarge the microspheres and/or to improve the surface smoothness of the microspheres. On reheating, the internal gas pressure will increase and cause the microsphere to increase in size. After reheating to the desired size, for example, in a "shot tower", the microspheres are rapidly cooled to retain the increase in size.

The glass microspheres can be made in various diameters and wall thickness, depending upon the desired end use of the microspheres. The microspheres can have an outer diameter of 200 to 10,000 microns, preferably 500 to 6,000 microns, e.g. to 2000 microns, and more preferably 1,000 to 4,000 microns. The microspheres can have a wall thickness of 0.1 to 1,000 microns, preferably 0.5 to 400 microns, e.g. 10 to 100 microns, and more preferably 1 to 100 microns. Where a particular use or need requires it, the microspheres can also be made to have a wall thickness of 10 to 1,000 microns, preferably 20 to 400 microns and more preferably 50 to 100 microns.

The microspheres, because the walls are free of any holes and substantially free of any thinned wall sections, trapped gas bubbles, and/or sufficient amounts of dissolved gases to form trapped bubbles, are substantially stronger than those heretofore produced. The absence of a sealing tip also makes the microspheres stronger.

The high pressure gas containing microspheres after cooling to ambient temperatures can contain a gaseous material at about ambient pressure or at superatmospheric pressure in the enclosed volume. The microspheres can have a contained gas pressure of about 5 to 8,000 p.s.i.g., usually 15 to 2,000 p.s.i.g. about 15 to 1600 p.s.i.g. and more usually 90 to 1,000 p.s.i.g. The contained gaseous materials can also be at pressures of 1 to 2,000 p.s.i.g., and 100 to 1800 p.s.i.g. The contained gas pressures are preferably at 800 to 1200 p.s.i.g., depending on the contained gaseous materials. Depending on the glass composition, diameter and wall thickness of the microspheres, the microspheres can contain gases under pressures of up to and/or greater than 3,000 to 5,000 p.s.i.g.

The microspheres can contain a metal coating on the inner wall surface of the hollow microspheres when a metal vapor, dispersed metal particles and/or an organo metal compound is mixed with the gaseous material blowing gas.

The thickness of the metal vapor coating deposited on the inner wall surface of the microsphere will depend on the metal vapor used to blow the microsphere, the pressure of the metal vapor and the size of the microsphere. The thickness of the metal coating can be 25 to 10,000 Å, preferably 50 to 5,000 Å and more preferably 100 to 1,000 Å. The thickness of the metal coating can also be 25 to 1,000 Å, preferably 50 to 600 Å and more preferably 100 to 400 Å.

The microspheres can also contain a thin metal layer deposited on the inner wall surface of the microsphere where the blowing gas contains dispersed metal particles or an organo metal compound. The thickness of the thin metal coating deposited on the inner wall surface of the microsphere will depend on the amount and particle size of the dispersed metal particles or partial pressure of organo metal blowing gas that are used and the diameter of the microsphere. The thickness of the thin metal coating can be 25 to 10,000 Å, preferably 50 to 5,000 Å and more preferably 100 to 1,000 Å.

When it is desired that the deposited metal coating be transparent, the coating can be less than 100 A and preferably less than 80 A. The transparent metal coated microspheres can have a deposited metal coating 25 to 95 A and preferably 50 to 80 A thick. The microspheres, though transparent to visible light, are substantially reflective of infrared radiation.

When it is desired that the deposited metal coating be reflective, the coating can be more than 100 Å and preferably more than 150 Å thick. The reflective metal coated microspheres can have a deposited metal coating 105 to 600 Å and preferably 150 to 400 Å thick and more preferably 150 to 250 Å thick.

The microspheres can be formed in a manner such that they are connected by continuous thin glass filaments, that is they are made in the form of filamented microspheres. The length of the connecting filaments can be 1 to 40, usually 2 to 20 and more usually 3 to 15 times the diameter of the microspheres. The diameter, that is the thickness of the connecting filaments can be 1/5000 to 1/10, usually 1/2500 to 1/20 and more usually 1/1000 to 1/30 of the diameter of the microspheres.

In an embodiment of the invention, the ratio of the diameter to the wall thickness of the microspheres is selected such that the microspheres are flexible, i.e. can be deformed under pressure without breaking.

The diameter and wall thickness of the hollow microspheres will of course effect the average bulk density of the microspheres. The glass microspheres prepared in accordance with the invention will have an average bulk density of 0.2 to 15 lb/ft$^3$, preferably 0.5 to 10 lb/ft$^3$ and more preferably 0.75 to 6 lb/ft$^3$. Where increase strength is desired, the microspheres can have an average bulk density of 1.0 to 15 lb/ft$^3$, preferably 1.5 to 12 lb/ft$^3$ and more preferably 2 to 9 lb/ft$^3$.

The hollow glass microspheres of the present invention can be used to, for example, contain oxygen gas (at ambient temperature) under a pressure of 100 to 3,000 p.s.i.g., preferably 100 to 1,000 p.s.i.g. and hydrogen under a pressure of 50 to 4,000 p.s.i.g., preferably 50 to 2,000 p.s.i.g. (at ambient pressures). The respective gases can be placed in relatively light weight containers and used for under water oxygen torch cutting or welding. The oxygen container and hydrogen container can each contain a small "roller drum" mill to which is fed necessary amounts of the respective microspheres to obtain and maintain a desired operating pressure for each of the gases. The oxygen containing glass microspheres can also be used in submersible vessels for emergency oxygen supply. This procedure avoids the need of heavy pressure resistant metal cylinders and complex valve and metering systems.

Microspheres containing oxygen under high pressure can be stored separately than mixed or can be directly mixed with a solid, powdered or liquid fuel such as used in rocket engines. The solid or liquid fuel and/or oxygen containing microspheres are fed directly into a combustion chamber, the oxygen released and any remaining portion of the microspheres expelled with the combustion exhaust products.

The microspheres can also be used to design low pollution exhaust combustion engines. The oxygen containing microspheres can be used with methane or hydrogen containing microspheres. The respective microspheres would be crushed to release the contained gases, the gases mixed and burned to drive a turbine or "conventional" internal combustion engine. Any unburned remains of the crushed microspheres are collected and later removed from the engine.

In a preferred embodiment of the present invention, hollow glass microspheres are made which contain a mixture of deuterium and tritium gases at a pressure of 1000 to 1500 p.s.i.g. (ambient temperature) which find particular use as targets in laser hydrogen fusion reactors and/or research. These microspheres can be stored at about ambient temperatures without any significant diffusion of the high pressure gases out of the microspheres.

In another embodiment of the present invention, hollow glass microspheres are made which contain carbon monoxide gas at pressures of 500 to 3000 p.s.i.g., preferably 500 to 1000 p.s.i.g. (ambient temperature) which greatly facilitates the handling and/or storage of this gas.

In another embodiment of the present invention, hollow glass microspheres are made which contain an unstable gas, for example, acetylene at pressures of 10 to 750 p.s.i.g. (ambient temperature). The use of microspheres to contain the acetylene gas is found to stabilize the gas by limiting the contact between adjacent gas molecules such that chain decomposition reactions of the gas molecules do not occur.

In another embodiment of the invention, radioactive fuel waste gases such as xenon and iodine are encapsulated in the hollow glass microspheres at contained gas pressure of 400 to 600 p.s.i.g. (ambient temperature). These microspheres can be stored in geological formations or mixed with concrete, surrounded by a lead shield and safely stored in any suitable location.

In another embodiment of the invention microspheres containing oxygen under high pressure can be uniformly mixed with solid, plastic, liquid or gaseous explosive materials to make a stable premixed explosive composition with a self contained oxident. Since the oxygen is contained in the microsphere, it is completely separated from the explosive material and until time of detonation the explosive mixtures are very stable. The mixture is detonated by a conventional percussion cap. The present invention thus avoids the need of nonstable and expensive oxidents.

The simplicity, controllability and low cost of the microsphere system of the present invention allows for the storage, shipment and uses of gases under high pressure with the same ease of handling as liquids and/or free flowing powders. A particular advantage of the disclosed system would be in reacting two or more gaseous materials or a reactant gas and a liquid. For example, the reactant gases could be first homogeneously mixed and the reaction carried out by feeding the mixture to a reaction vessel in which the mixed microspheres would be crushed at a controlled rate.

The hollow glass microspheres are dry, inert, free flowing and can be safely handled and processed, and do not require special storage or handling facilities. Further, since the volume and pressure of each microsphere is controlled, the weight of a given amount of gas is easily measured.

The hollow glass microspheres of the present invention have a distinct advantage of being very strong and capable of supporting a substantial amount of weight. They can thus be used to make simple inexpensive self-supporting or load bearing handling and storage systems.

A specific and advantageous use of the hollow glass microspheres of the invention is in the manufacture of inertial confinement fuel target systems and systems for the storage of radioactive atomic waste materials.

EXAMPLES

Example 1

A glass composition (Col. A) comprising the following constituents is used to make hollow glass microspheres.

|     | $SiO_2$ | $Al_2O_3$ | CaO | MgO | $B_2O_3$ | $Na_2O$ |
| --- | --- | --- | --- | --- | --- | --- |
| Wt% | 55–57 | 18–22 | 5–7 | 10–12 | 4–5 | 1–2 |

The glass composition is heated to a temperature of 2650° to 2750° F. to form a fluid molten glass having a viscosity of 10 to 60 poises, e.g. 35 to 60 poises and a surface tension of 275 to 325 dynes per cm.

The molten glass is fed to the apparatus of FIGS. 1 and 2 of the drawings. The molten glass passes through annular space 8 of blowing nozzle 5 and forms a thin liquid molten glass film across the orifices 6a and 7a. The blowing nozzle 5 has an outside diameter of 0.040 inch and orifice 7a has an inside diameter of 0.030 inch. The thin liquid molten glass film has a diameter of 0.030 inch and a thickness of 0.005 inch. An oxygen gaseous material blowing gas at a temperature of 2650° F. and at a pressure of 6000 to 8000 p.s.i.g. is applied to the inner surface of the molten glass film causing the film to distend downwardly into an elongated cylinder shape with its outer end closed and its inner end attached to the outer edge of orifice 7a. The pressure in the area of the blowing nozzle is maintained at slightly less than 6000 to 8000 p.s.i.g.

The transverse jet is used to direct an inert entraining fluid which consists of nitrogen at a temperature of 2600° F. over and around the blowing nozzle 5 which entraining fluid assists in the formation and closing of the elongated cylinder shape and the detaching of the cylinder from the blowing nozzle and causing the cylinder to fall free of the blowing nozzle. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above the orifice 7a.

The free falling elongated cylinders filled with oxygen gas quickly assume a spherical shape and are rapidly cooled to about ambient temperature by a quench fluid consisting of a fine water spray at a temperature of 90° to 150° F. which quickly cools, solidifies and hardens the glass microspheres.

Clear, uniformed size, smooth hollow glass microspheres having a 2000 to 3000 micron diameter, a 3 to 10 micron, preferably a 20 to 30 micron, wall thickness and filled with oxygen gas at an internal contained pressure of 1025 to 1370 p.s.i.g. are obtained. The microspheres are closely examined and the walls are found to be free of any trapped gas bubbles.

Example 2

A glass composition (Col. B) comprising the following constituents is used to make transparent hollow glass microspheres.

| | SiO$_2$ | Al$_2$O$_3$ | Li$_2$O | MgO | B$_2$O$_3$ | Na$_2$O | K$_2$O |
|---|---|---|---|---|---|---|---|
| Wt% | 62–64 | 6–8 | 14–16 | 0–2 | 2–3 | 1–2 | 0.5–1 |

The glass composition is heated to a temperature of 2650° to 2750° F. to form a fluid molten glass having a viscosity of 35 to 60 poises and a surface tension of 275 to 325 dynes per cm.

The molten glass is fed to the apparatus of FIGS. 1 and 3a of drawings. The molten glass is passed through annular space 8 of blowing nozzle 5 and into tapered portion 21 of outer nozzle 7. The molten glass under pressure is squeezed through a fine gap formed between the outer edge of orifice 6a and the inner surface 22 of the tapered portion 21 of outer nozzle 7 and forms a thin liquid molten glass film across the orifices 6a and 7a'. The blowing nozzle 5 has an outside diameter of 0.04 inch and orifice 7a has an inside diameter of 0.01 inch. The thin liquid molten glass film has a diameter of 0.01 inch and thickness of 0.003 inch. A mixture of deuterium and tritium gases, for manufacture of inertial confinement system targets, is used as the blowing gas at a temperature of 2700° F. and at a pressure of 12,000 to 14,000 p.s.i.g. is applied to the inner surface of the molten glass film causing the film to distend outwardly into an elongated cylinder shape with its outer end closed and its inner end attached to the outer edge of orifice 7a'. The pressure in the area of the blowing nozzle is maintained at slightly less than 12,000 to 14,000 p.s.i.g.

The transverse jet is used to direct an inert entraining fluid which consists of nitrogen at a temperature of 2600° F. over and around the blowing nozzle 5 which entraining fluid assists in the formation and closing off of the elongated cylinder shape and the detaching of the cylinder from the blowing nozzle and causing the cylinder to fall free of the blowing nozzle. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above orifice 7a'.

The free falling elongated cylinders filled with the inertial confinement fuel gas quickly assume a spherical shape. The microspheres are contacted with a quench fluid consisting of a fine water spray at a temperature of 90° to 150° F. which quickly cools, solidifies and hardens the microspheres.

Clear, uniform size, smooth, hollow glass microspheres having an about 800 to 900 micron diameter, a 8 to 20 micron wall thickness and an internal contained pressure of laser target fuel of 2040 to 2380 p.s.i.g. The thin walls of the microspheres are free of any trapped gas bubbles.

Example 3

The glass composition (Col. C) comprising the following constituents is used to make hollow glass microspheres.

| | SiO$_2$ | Al$_2$O$_3$ | Zirconia | CaO | MgO | B$_2$O$_3$ | Na$_2$O | K$_2$O |
|---|---|---|---|---|---|---|---|---|
| Wt% | 45–55 | 8–10 | 16–18 | 1–2 | 0–1 | 1–2 | 1–2 | 0–1 |

The glass composition is heated to a temperature of 2650° to 2750° F. to form a fluid molten glass having a viscosity of 35 to 60 poises and a surface tension of 275 to 325 dynes per cm.

The molten glass is fed to the apparatus of FIGS. 1 and 3a of the drawings. The molten glass is passed through annular space 8 of blowing nozzle 5 and into tapered portion 21 of outer nozzle 7. The molten glass under pressure is squeezed through a fine gap between the outer edge of orifice 6a and the inner surface 22 of the tapered portion 21 of outer nozzle 7 and forms a thin liquid molten glass film across the orifices 6a and 7a'. The blowing nozzle 5 has an outside diameter of 0.05 inch and orifice 7a' has an inside diameter of 0.03 inch. The thin liquid molten glass film has a diameter of 0.03 inch and a thickness of 0.01 inch. A gaseous atomic energy fuel waste product consisting of tritium blowing gas at a temperature of 2600° F. and at a pressure of 5000 to 6000 p.s.i.g. is applied to the inner surface of the molten glass film causing the film to distend outwardly into an elongated cylinder shape with its outer end closed and its inner end attached to the outer edge of orifice 7a'. The pressure in the area of the blowing nozzle is maintained at slightly less than 5000 to 6000 p.s.i.g.

The transverse jet is used to direct an inert entraining fluid which consists of nitrogen gas at a temperature of 2500° F. over and around the blowing nozzle 5 which entraining fluid assists in the formation and closing of the elongated cylinder shape and the detaching of the cylinder from the blowing nozzle and causing the cylinder to fall free of the blowing nozzle. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above orifice 7a'.

The free falling elongated cylinders filled with the gaseous atomic waste material quickly assume a spherical shape. The microspheres are contacted with a quench fluid consisting of an ethylene glycol spray at a temperature of 0° to 15° F. which quickly cools, solidifies and hardens the glass microspheres.

Clear, uniformed size, smooth, hollow glass microspheres having an about 3000 to 4000 micron diameter, a 10 to 20 micron wall thickness and an internal contained pressure of the atomic gas waste material of 850 to 1020 p.s.i.g. are obtained. The glass composition from which these microspheres are made are alkali resistant and the microspheres can be conveniently stored in concrete.

Example 4

A hollow glass microsphere containing hydrogen gas under pressure is made using the same glass composition, apparatus and procedure described in Example 1 with the following differences. Hydrogen gas is used as the gaseous material blowing gas at a temperature of 2400° F. and a pressure of 4000 to 5000 p.s.i.g. is applied to the inner surface of the molten glass film causing the film to distend downwardly into an elongated cylinder shape with its outer end closed and its inner end attached to the outer edge of orifice 7a. The pressure in the area of the blowing nozzle is maintained at slightly less than 4000 to 5000 p.s.i.g.

The transverse jet as before is used to direct an inert entraining fluid which consists of nitrogen at a temperature of 2400° F. over and around the blowing nozzle 5 which entraining fluid assists in the formation and closing of the elongated cylinder shape and the detaching of the cylinder from the blowing nozzle and causing the cylinder to fall free of the blowing nozzle.

The free falling elongated cylinders filled with hydrogen gas quickly assume a spherical shape and are rapidly cooled as before to about ambient temperature by a quench fluid which quickly cools, solidifies and hardens the glass microspheres.

Clear, uniformed size, smooth, hollow glass microspheres having a 2000 to 3000 micron diameter, a 5 to 10 micron wall thickness and filled with hydrogen gas at an internal contained pressure of about 750 to 950 p.s.i.g. are obtaind. The hydrogen gas containing microspheres can be used to store and handle hydrogen gas and can themselves be used as a fuel in an hydrogen-oxygen combustion system.

Example 5

A hollow glass microsphere containing carbon dioxide gas under pressure is made using the same glass composition, apparatus and procedure described in Example 1 with the following differences. Carbon dioxide gas is used as the gaseous material blowing gas at a temperature of 2400° F. and a pressure of 4000 to 5000 p.s.i.g. is applied to the inner surface of the molten glass film causing the film to distend outwardly into an elongated cylinder shape with its outer end closed and its inner end attached to the outer edge of orifice 7a. The pressure in the area of the blowing nozzle is maintained at slightly less than 4000 to 5000 p.s.i.g.

The transverse jet as before is used to direct an inert entraining fluid which consists of nitrogen at a temperature of 2400° F. over and around the blowing nozzle 5 which entraining fluid assists in the formation and closing off of the elongated cylinder shape and the detaching of the cylinder from the blowing nozzle and causing the cylinder to fall free of the blowing nozzle.

The free falling elongated cylinders filled with carbon dioxide gas quickly assume a spherical shape and are rapidly cooled as before to about ambient temperature by a quench fluid which quickly cools, solidifies and hardens the microspheres.

Clear, uniformed size, smooth, hollow glass microspheres having a 2000 to 3000 micron diameter, a 5 to 10 micron wall thickness and filled with carbon dioxide gas at an internal pressure of about 750 to 950 p.s.i.g. are obtained. The carbon dioxide containing microspheres can be used to store and handle carbon dioxide gas and can themselves be used in a "dry powder" fire extinguisher system as the fire extinguishing ingredient.

A transparent or reflective metal coating can be deposited on the inner wall surface of the microspheres produced in accordance with the above Examples by the addition to the blowing gas of a metal vapor, e.g. zinc vapor, dispersed metal particles, e.g. aluminum powder or an organo metal compound, e.g. nickel carbonyl. The microspheres can also be made in a non-filamented as well as a filamented form by following the teachings of the present invention. Further, applicant in his copending application Ser. No. 059,297 filed July 20, 1979 has presented specific Examples for making microspheres having a thin metal layer deposited on the inner wall surface thereof from a blowing gas consisting a metal vapor and from a blowing gas containing dispersed metal particles and for making non-filamented microspheres and filamented microspheres. The disclosure of the parent application is incorporated herein by reference.

UTILITY

The hollow glass microspheres of the present invention have many uses including the handling and storage of oxygen, hydrogen, nitrogen and carbon dioxide at high pressures in light easy to handle containers.

The process and apparatus described herein can also be used to encapsulate and store gaseous materials in hollow glass microspheres of a suitable non-interacting composition, thereby allowing handling or storage of gases generally, and of corrosive and toxic or otherwise hazardous gases specifically. Because of the relative great strength of the microspheres, the gases may be encapsulated in the microspheres and stored at high contained gas pressures. In the case where disposal by geological storage is desired, for example, for poisonous and/or other toxic gases, the gases can be encapsulated in very durable alumina silicate composition or zirconia composition glass microspheres which can subsequently be embedded, if desired, in a concrete structure. The glass microspheres of the present invention, because they can be made to contain gases under high pressure, can be used to manufacture fuel targets for inertial confinement fusion reactor systems.

The microspheres can be used to manufacture inertial confinement fusion fuel targets for use in hydrogen fusing reactors and/or research. Because of the ability of manufacturing microspheres of specific diameters and wall thicknesses in which there is contained the target fuel under predetermined high pressure and because the microspheres can be produced with glass compositions which substantially prevent diffusion of gases into or out of the microspheres and glass compositions which have the desired atomic constituents, the microspheres find particular and advantageous use in the manufacture of the inertial confinement targets.

The present invention also has particular utility for encapsulating toxic, corrosive and/or radioactive gaseous materials in a manner such that they can be compressed at a high pressure to a substantially reduced volume and put into a form contained in the microspheres in which they are safe and easy to handle. The constituents of the glass composition can be selected to be resistant to attack by the material encapsulated and can be made resistant to alkali such that the microspheres can be mixed with and stored in concrete blocks. The concrete blocks can be safely shipped to geological sites for permanent storage.

The process and apparatus of the present invention can be used to blow microspheres from any suitable molten material having sufficient viscosity and surface tension at the temperature at which the microspheres are blown to form the elongated cylinder shape of the material being blown and to subsequently be detached to form the spherical shape microspheres.

Where the gases to be encapsulated are unstable at high temperatures, low temperature melting glass compositions can be used such as those containing relatively high concentrations of lead and/or thallium.

The microspheres, because they are made from very stable glass compositions, are not subject to degradation by outgassing, aging, moisture, weathering or biological attack and the glass from which the microspheres are made do not produce toxic fumes when exposed to very high temperatures or fire.

The glass compositions can be transparent, translucent or opaque. A suitable coloring material can be added to the glass compositions to aid in identification of microspheres of specified size, wall thickness and contained gaseous material. The coloring materials can also be used to identify the contained gas pressures.

The glass compositions can also be selected to produce microspheres that will be selectively permeable to specific gases and/or organic molecules. These microspheres can then be used as semipermeable membranes to separate gaseous or liquid mixtures.

The process and apparatus of the present invention can also be used to form microspheres from thermosetting and thermoplastic resin materials such as polyethylene, polypropylene, polystyrene, polyesters, polyurethanes, phenolformaldehyde resins and silicone and carbonate resins. The lower temperature melting resins are particularly useful for encapsulating gases that are unstable at high temperatures.

The process and apparatus of the invention can also be used to form microspheres from metals such as iron, steel, copper, zinc, tin, brass, lead, aluminum, and magnesium. In order to form microspheres from these materials, suitable additives are used which provide at the film surface of the microsphere a sufficiently high viscosity that a stable microsphere can be formed.

In carrying out the process of the present invention, the molten material to be used to form the microspheres is selected and can be treated and/or mixed with other materials to adjust their viscosity and surface tension characteristics such that at the desired blowing temperatures they are capable of forming hollow microspheres of the desired size and wall thickness.

The process of the present invention can also be carried out in a centrifuge apparatus in which the coaxial blowing nozzles are disposed in the outer circumferal surface of the centrifuge at an angle of 15° to 75° away from the direction of rotation. Molten glass is fed into the centrifuge and because of centrifugal forces rapidly coats and wets the inner wall surface of the outer wall of the centrifuge. The molten glass is fed into the outer coaxial nozzle. The inlet to the inner coaxial nozzle is disposed above the coating of molten glass. The blowing gas is as before fed into the inner coaxial nozzle. The transverse jet entraining fluid is provided by the action of the ambient gas outside of the centrifuge as the centrifuge rotates about its central axis. An external gas can be directed along the longitudinal axis of the centrifuge to assist in removing the microspheres from the vicinity of the centrifuge as they are formed. Quench fluid can be provided as before.

These and other uses of the present invention will become apparent to those skilled in the art from the foregoing description and the following appended claims.

It will be understood that various changes and modifications may be made in the invention and that the scope thereof is not to be limited except as set forth in the claims.

I claim:

1. A method for compressing and encapsulating gaseous materials at elevated pressures in hollow microspheres made from inorganic film forming material which comprises heating said inorganic film forming material, forming a liquid film of said material across an orifice, applying a blowing gas at a positive pressure of above 50 p.s.i.g. to the inner surface of the liquid film to blow the film and form the microsphere, subjecting the microsphere during its formation to an external pulsating or fluctuating pressure field having periodic oscillations, said pulsating or fluctuating pressure field acting on said microsphere to assist in its formation and to assist in detaching the microsphere from said orifice.

2. The method of claim 1 wherein the liquid film of inorganic film forming material is formed across the orifice of a coaxial blowing nozzle, said blowing nozzle having an inner nozzle to convey said blowing gas to the inner surface of the liquid film, and an outer nozzle to convey said material to said orifice.

3. The method of claim 1 wherein the inorganic film forming material has a viscosity of 10 to 600 poises.

4. The method of claim 1 wherein the inorganic film forming material has a viscosity of 20 to 100 poises.

5. The method of claim 1 wherein the inorganic film forming material has a viscosity of 100 to 400 poises.

6. The method of claim 1 wherein the blowing gas contains dispersed metal particles.

7. The method of claim 1 wherein said blowing gas contains an organo metal compound.

8. The method of claim 1 wherein said blowing gas contains a metal vapor.

9. The method of claim 2 wherein the inorganic film forming material is continuously fed to said blowing nozzle while said elongated cylinder is being formed.

10. The method of claim 1 wherein an entraining fluid is directed at an angle to a coaxial blowing nozzle having an orifice, an inner nozzle and an outer nozzle, the liquid film of inorganic film forming material is formed across the orifice, the blowing gas is conveyed to the inner surface of the liquid film through said inner nozzle, the inorganic film forming material is conveyed through said outer nozzle to said orifice, and the entraining fluid passes over and around said coaxial nozzle to fluid dynamically induce the pulsating or fluctuating pressure field at the opposite or lee side of the blowing nozzle in the wake or shadow of the coaxial blowing nozzle.

11. A method for compressing and encapsulating gaseous materials at elevated pressures in filamented, hollow glass microspheres which comprises heating glass to form molten glass, forming a liquid film of molten glass across an orifice of a coaxial blowing nozzle, said blowing nozzle having an inner nozzle to convey said gaseous material as a blowing gas to the inner surface of the liquid film and an outer nozzle to convey molten glass to said orifice, the lower portion of said outer nozzle being tapered inwardly to form with the outer edge of the inner nozzle a fine gap, feeding the molten glass under pressure through said gap and forming said film of molten glass across said orifice of the blowing nozzle, feeding said gaseous material blowing gas through said inner nozzle at a pressure of 100 to 10,000 p.s.i.g. to the inner surface of the liquid film to blow the film downwardly and outwardly to form the microsphere, continuously feeding said molten glass to said outer nozzle while said microsphere is being formed, maintaining a pressure in the area of said blowing nozzle about equal to, but slightly less than the pressure of said blowing gas, directing an entraining fluid at said coaxial blowing nozzle, at a linear velocity in the region of microsphere formation of about 1 to 50 feet per second to obtain connecting glass filaments between microspheres, and at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling, solidifying and hardening said microsphere to obtain microspheres of 500 to 6,000 microns diameter and 0.5 to 400 microns wall thickness, and said microspheres being connected by thin filamented portions that are continuous with the glass microspheres.

12. The method of claim 1 wherein said entraining fluid has a linear velocity in the region of microsphere formation of 1 to 120 ft/sec and entrains and transports the microspheres away from the blowing nozzle.

13. The method of claim 12 wherein said entraining fluid has a linear velocity in the region of microsphere formation of 40 to 100 ft/sec.

14. The method of claim 12 wherein said entraining fluid has a linear velocity in the region of microsphere formation of 5 to 40 ft/sec.

15. The method of claim 1 wherein said entraining fluid is directed at said coaxial blowing nozzle at an angle of 15° to 85° relative to a line drawn through the center axis of said coaxial blowing nozzle and said outer nozzle.

16. The method of claim 1 wherein said entraining fluid intersects said coaxial blowing nozzle at a point 0.5 to 4 times the outside diameter of the coaxial blowing nozzle above the orifice of said blowing nozzle.

17. The method of claim 1 wherein the lower portion of the outer nozzle is tapered inwardly to form with the outer edge of the inner nozzle a fine gap and the inorganic film forming material is fed under pressure and extruded through said gap to form a thin film of inorganic film forming material across the orifice of the blowing nozzle.

18. A method for compressing and encapsulating gaseous material at elevated pressures which comprises forming a liquid film of molten glass across an orifice, feeding said gaseous material as a blowing gas at a positive pressure of above 100 p.s.i.g. to the inner surface of the liquid film to blow the film and form a microsphere, subjecting the microsphere during its formation to a pulsating or fluctuating pressure fluid having periodic oscillations, said pulsating or fluctuating pressure field acting on said microsphere to assist in its formation and to assist in detaching the microspheres from said orifice.

19. The method of claim 18 wherein said liquid film of molten glass is formed across the orifice of a coaxial blowing nozzle, said blowing nozzle having an inner nozzle to convey said blowing gas to the inner surface of the liquid film, and an outer nozzle to convey said molten glass to said orifice.

20. The method of claim 1 wherein said blowing gas is a member selected from the group consisting of nitrogen, oxygen, hydrogen, carbon dioxide, air, helium, methane and acetylene gaseous materials.

21. The method of claim 1 wherein said blowing gas is a member selected from the group consisting of poisonous, toxic, corrosive and radioactive gaseous materials.

22. The method of claim 1 wherein said blowing gas is a member selected from the group consisting of deuterium, tritium, and mixtures thereof.

23. The method of claim 1 wherein the blowing gas is at a pressure of 100 to 10,000 p.s.i.g. and the molten glass and ambient gas pressures are at pressures slightly below 100 to 10,000 p.s.i.g.

24. The method of claim 23 wherein a microsphere formed from the molten glass has a contained gas pressures at ambient temperature of about 15 to 1600 p.s.i.g.

25. The method of claim 23 wherein the glass microspheres are about 200 to 10,000 microns in diameter.

26. The method of claim 19 wherein said blowing gas blows said film downwardly and outwardly to form an elongated cylinder shaped liquid film of molten glass which is closed at its outer end and is connected at its inner end to the outer edge of the orifice of said blowing nozzle.

27. The method of claim 26 wherein molten glass is continuously fed to said blowing nozzle while said elongated cylinder is being formed.

28. The method of claim 18 wherein said pulsating or fluctuating pressure field is induced by directing an entraining fluid at an angle to a coaxial blowing nozzle having a liquid molten glass film formed across the orifice of said coaxial nozzle and said coaxial nozzle having an inner nozzle to convey said blowing gas to the inner surface of the liquid film, and an outer nozzle to convey said molten glass to said orifice.

29. The method of claim 28 wherein said entraining fluid passes over and around said coaxial blowing nozzle to fluid dynamically induce said pulsating or fluctuating pressure field at the opposite or lee side of the blowing nozzle in the wake or shadow of said coaxial blowing nozzle and said pressure field has periodic lateral oscillations.

30. The method of claim 18 wherein quench means direct a quench fluid into contact with said microsphere after it is detached to rapidly cool and solidify said microsphere.

31. The method of claim 28 wherein said entraining fluid is directed at said coaxial blowing nozzle at an angle of 15° to 85° relative to a line drawn through the center axis of said coaxial blowing nozzle and said outer nozzle.

32. The method of claim 31 wherein said entraining fluid intersects said coaxial blowing nozzle at a point 0.5 to 4 times the outside diameter of the coaxial blowing nozzle above the orifice of said outer nozzle.

33. A method for compressing and encapsulating gaseous material at elevated pressures of above 100 p.s.i.g. which comprises forming a liquid film of molten glass across an orifice of a coaxial blowing nozzle, said blowing nozzle having an inner nozzle to feed said gaseous material as a blowing gas to the inner surfaces of the liquid film and an outer nozzle to convey said molten glass at a temperature of 2000° to 2800° F. to said orifice, feeding said blowing gas through said inner nozzle at a pressure of above 100 p.s.i.g. to the inner surface of the liquid film to blow the film downwardly and outwardly to form an elongated cylinder shaped liquid film of molten glass which is closed at its outer end and connected at its inner end to the outer edge of the orifice of said blowing nozzle, continuously feeding said molten glass to said nozzle while said elongated cylinder is being formed, maintaining a pressure in the area of said blowing nozzle about equal to, but slightly less than the pressure of said blowing gas, directing entraining fluid at said coaxial blowing nozzle at an angle of 25° to 75°, relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, whereby said entraining fluid envelops and acts on the elongated cylinder to flap, fold, pinch and close-off said elongated cylinder at its inner end at a point proximate to the coaxial blowing nozzle and said entraining fluid acting through drag forces on said cylinder to detach the cylinder from the coaxial blowing nozzle whereby surface tension forces cause the cylinder to form a spherical shape microsphere and rapidly cooling and solidifying said microsphere.

34. The process of claim 33 wherein hollow glass microspheres are obtained which at ambient temperature have a contained gap pressure of up to 2000 p.s.i.g.

35. The method of claim 33 wherein the blowing gas is a member selected from the group consisting of oxygen, hydrogen, nitrogen and carbon monoxide.

36. The method of claim 33 wherein the blowing gas is a radioactive gas which is a member selected from the group consisting of radon, tritium, krypton, xenon and iodine.

37. The method of claim 33 wherein said blowing gas is a member selected from the group consisting of deuterium, tritium, and mixtures thereof.

38. The method of claim 33 wherein the glass microspheres are 200 to 10,000 microns in diameter.

39. The method of claim 33 wherein the glass microspheres have a wall thickness of 0.1 to 1000 microns.

40. The method of claim 33 wherein the glass microspheres have a diameter of 500 to 2000 microns and a wall thickness of 10 to 100 microns.

41. The method of claim 33 wherein said entraining fluid intersects said coaxial blowing nozzle at a point 0.5 to 4 times the outside diameter of the coaxial blowing nozzle above the orifice of said blowing nozzle.

42. The method of claim 41 wherein said entraining fluid is directed at said coaxial blowing nozzle through a transverse jet disposed a distance of 0.5 to 14 times the outside diameter of the coaxial blowing nozzle away from the point of intersect of a line drawn along the center axis of transverse jet and a line drawn along the center axis of the coaxial blowing nozzle.

43. The method of claim 33 wherein the microsphere is contacted with a quench fluid and is cooled, solidified and hardened.

44. The method of claim 33 wherein the blowing gas includes a metal vapor, the microsphere is cooled, solidified and hardened and a metal coating is deposited on the inner wall surface of the microsphere.

45. The method of claim 33 wherein the lower portion of the outer nozzle is tapered inwardly to form with the outer edge of the inner nozzle a fine gap and the molten glass is fed under pressure through said gap to form a thin film of molten glass across the orifice of the blowing nozzle.

46. An apparatus for blowing hollow gas microspheres comprising a coaxial blowing nozzle consisting of an inner nozzle having an inner orifice at the lower end thereof for a blowing gas and means to feed blowing gas to said nozzle at a pressure of above 100 p.s.i.g., and an outer nozzle having an outer orifice for molten glass, said inner nozzle orifice being disposed proximate to said outer orifice, the pressure in the area of said outer nozzle being about equal to, but slightly less than the pressure of said blowing gas, there being disposed external to said blowing nozzle means cooperating with said blowing nozzle by which an entraining fluid is directed at said coaxial blowing nozzle at an angle of 25° to 75° relative to a line drawn through the center axis of said coaxial blowing nozzle such that said entraining fluid dynamically induces a pulsating of fluctuating pressure field having periodic oscillations at the opposite or lee side of the blowing nozzle in the wake or shadow of said blowing nozzle.

47. The apparatus of claim 46 wherein the lower portion of the outer nozzle is tapered inwardly.

48. The method of claim 2 wherein pulsating or fluctuating pressure inducing means is directed at an angle to said coaxial blowing nozzle to induce a pulsating or fluctuating pressure field at the opposite or lee side of said coaxial blowing nozzle in the wake or shadow of said coaxial blowing nozzle.

49. The method of claim 19 wherein pulsating or fluctuating pressure inducing means is directed at an angle to said coaxial blowing nozzle to induce a pulsating or fluctuating pressure field at the opposite or lee side of said coaxial blowing nozzle in the wake or shadow of said coaxial blowing nozzle.

50. A method for compressing and encapsulating gaseous material at elevated pressures in hollow glass microspheres which comprises forming a liquid film of molten glass across an orifice of a coaxial blowing nozzle, said blowing nozzle having an inner nozzle to convey said gaseous material as a blowing gas to the inner surface of the liquid film and an outer nozzle to convey said molten glass to said orifice, feeding said gaseous material through said inner nozzle at a pressure of above 50 p.s.i.g. to the inner surface of the liquid film to blow the film downwardly and outwardly to form the microsphere, continuously feeding said molten glass to said outer nozzle while said microsphere is being formed, maintaining a pressure in the area of said blowing nozzle about equal to, but slightly less than the pressure of said blowing gas, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling and solidifying said microsphere.

51. The method of claim 50, wherein the lower portion of the outer nozzle is tapered inwardly to form with the outer edge of the inner nozzle a fine gap and feeding the molten glass under pressure through said gap to form a thin film of molten glass across the orifice of the blowing nozzle.

52. The method of claim 50 wherein the blowing gas is a member selected from the group consisting of nitrogen, oxygen, hydrogen, carbon dioxide, air, helium, methane and acetylene gaseous materials.

53. An apparatus for compressing and encapsulating gaseous material at elevated pressures in inorganic film forming material microspheres, comprising a coaxial blowing nozzle comprising an inner nozzle having an inner orifice at the lower end thereof for said gaseous material and means to feed gaseous material to said nozzle at a pressure of above 50 p.s.i.g., and an outer nozzle having an outer orifice for molten material, and means for feeding said film forming material to said coaxial nozzle, said inner nozzle orifice being disposed proximate to said outer orifice, the pressure in the area of said outer nozzle being about equal to, but slightly less than the pressure of said gaseous material, there being disposed external to said blowing nozzle means cooperating with said blowing nozzle by which there is induced a pulsating or fluctuating pressure field having periodic oscillations at the opposite or lee side of the blowing nozzle in the wake or shadow of said blowing nozzle.

54. The apparatus of claim 53 wherein the lower portion of the outer nozzle is tapered inwardly to form with the outer edge of the inner nozzle a fine gap.

55. An apparatus for compressing the encapsulating gaseous materials at elevated pressure in hollow glass microspheres, comprising a coaxial blowing nozzle comprising an inner nozzle having an inner orifice at the lower end thereof for said gaseous material and means to supply said gaseous material to said nozzle at a pressure of above 50 p.s.i.g. and an outer nozzle having an outer orifice for molten glass, and means for feeding said molten glass to said outer nozzle, said inner nozzle orifice being disposed proximate to said outer nozzle orifice, the pressure in the area of said outer nozzle being about equal to, but slightly less than the pressure of said gaseous material, there being disposed external to said blowing nozzle a transverse jet cooperating with said blowing nozzle by which an entraining fluid is directed at said coaxial blowing nozzle at an angle relative to a line drawn through the center axis of said coaxial blowing nozzle such that said entraining fluid dynamically induces a pulsating or fluctuating pressure field having periodic oscillations at the opposite or lee side of the blowing nozzle in the wake or shadow of said blowing nozzle.

56. The apparatus of claim 55 wherein the lower portion of the outer nozzle is tapered inwardly to form with the outer edge of the inner nozzle a fine gap.

57. The apparatus of claim 55 wherein said transverse jet is directed at said coaxial blowing nozzle at an angle of 25° to 75° relative to said coaxial nozzle.

58. The apparatus of claim 55 wherein a line drawn along the center axis of the transverse jet intersects a line drawn along the center axis of the coaxial blowing nozzle at a point 0.5 to 4 times the outside diameter of the coaxial blowing nozzle above the orifice of said outer nozzle.

59. The apparatus of claim 55 wherein said transverse jet is disposed a distance of 0.5 to 14 times the outside diameter of the coaxial blowing nozzle away from the point of intersect of a line drawn along the center axis of the transverse jet and a line drawn along the center axis of the coaxial blowing nozzle.

60. A method for compressing and encapsulating gaseous materials at elevated pressures in hollow glass microspheres which comprises heating glass to form molten glass, forming a liquid film of molten glass across an orifice of a coaxial blowing nozzle, said blowing nozzle having an inner nozzle to convey said gaseous material as a blowing gas to the inner surface of the liquid film and an outer nozzle to convey molten glass to said orifice, the lower portion of said outer nozzle being tapered inwardly to form with the outer edge of the inner nozzle a fine gap, feeding the molten glass under pressure through said gap and forming said film of molten glass across said orifice of the blowing nozzle, feeding said gaseous material blowing gas through said inner nozzle at a pressure of 100 to 10,000 p.s.i.g. to the inner surface of the liquid film to blow the film downwardly and outwardly to form the microsphere, continuously feeding said molten glass to said outer nozzle while said microsphere is being formed, maintaining a pressure in the area of said blowing nozzle about equal to, but slightly less than the pressure of said blowing gas, directing an entraining fluid at said coaxial blowing nozzle at an angle relative to a line drawn through the center axis of said coaxial blowing nozzle, said entraining fluid passage over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling, solidifying and hardening said microsphere to obtain microspheres of 500 to 6,000 microns diameter and 0.5 to 400 microns wall thickness.

61. The method of claim 60 wherein the microspheres have a contained gas pressure at ambient temperature of about 15 to 1600 p.s.i.g.

62. The method of claim 60 wherein the microspheres are of substantially uniform diameter and wall thickness.

63. The method of claim 11 wherein the microspheres have a contained gas pressure at ambient temperature of about 15 to 1600 p.s.i.g.

64. The method of claim 11 wherein the length of the connecting filaments is substantially equal and is 2 1 to 20 times the diameter of the microspheres.

65. The method of claim 11 wherein the length of the connecting filaments is substantially equal and the diameter of the connecting filaments is 1/2500 to 1/20 the diameter of the microspheres.

66. The method of claim 11 wherein the microspheres are of substantially uniform diameter and wall thickness.

* * * * *